(12) United States Patent
Hatoh et al.

(10) Patent No.: US 6,531,236 B1
(45) Date of Patent: Mar. 11, 2003

(54) POLYMER ELECTROLYTE FUEL CELL STACK

(75) Inventors: Kazuhito Hatoh, Daito (JP); Eiichi Yasumoto, Kantano (JP); Kazufumi Nishida, Moriguchi (JP); Hisaaki Gyoten, Shijonawate (JP); Teruhisa Kanbara, Ikeda (JP); Hideo Ohara, Kadoma (JP); Makoto Uchida, Hirakata (JP); Yasushi Sugawara, Neyagawa (JP); Toshihiro Matsumoto, Ibaraki (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/497,058

(22) Filed: Feb. 2, 2000

Related U.S. Application Data

(63) Continuation of application No. PCT/JP99/02832, filed on May 27, 1999.

(30) Foreign Application Priority Data

Jun. 2, 1998 (JP) ............................................ 10-152470
Aug. 20, 1998 (JP) ............................................ 10-234748

(51) Int. Cl.⁷ .......................... H01M 8/02; H01M 8/10; H01M 8/24
(52) U.S. Cl. ............................ 429/34; 429/13; 429/35; 429/36
(58) Field of Search .............................. 429/13, 34, 35

(56) References Cited

U.S. PATENT DOCUMENTS

| | | | | | |
|---|---|---|---|---|---|
| 5,110,691 A | * | 5/1992 | Krasig | ........................... | 429/35 |
| 5,665,823 A | * | 9/1997 | Saxena | ........................ | 525/106 |
| 5,705,294 A | * | 1/1998 | Lake | ........................... | 429/163 |
| 5,879,826 A | * | 3/1999 | Lehman | ........................ | 429/13 |
| 6,128,179 A | * | 10/2000 | Morokuma | ................. | 361/517 |
| 6,187,466 B1 | * | 2/2001 | Schroll | ........................ | 429/34 |
| 6,198,622 B1 | * | 3/2001 | Nitta | ........................... | 361/504 |
| 6,231,053 B1 | * | 5/2001 | Wakamatsu | ................. | 277/628 |
| 6,262,879 B1 | * | 7/2001 | Nitta | ........................... | 361/517 |

FOREIGN PATENT DOCUMENTS

| | | |
|---|---|---|
| JP | 1-183071 A | 7/1989 |
| JP | 5-283093 A | 10/1993 |
| JP | 8-41138 | 2/1996 |
| JP | 8-162143 A | 6/1996 |
| JP | 9-55218 | 2/1997 |
| JP | 9-106792 | 4/1997 |
| JP | 9-289029 A | 11/1997 |
| JP | 10-55813 A | 2/1998 |
| JP | 10-87957 | 4/1998 |

* cited by examiner

*Primary Examiner*—Patrick Ryan
*Assistant Examiner*—Mark Ruthkosky
(74) *Attorney, Agent, or Firm*—Akin, Gump, Strauss, Hauer & Feld, L.L.P.

(57) ABSTRACT

The present invention provides a polymer electrolyte fuel cell stack that includes a cell laminate having a plurality of unit cells, which are laid one upon another and each of which includes a polymer electrolyte membrane, a pair of electrodes that are arranged across the polymer electrolyte membrane and respectively have a catalytic reaction layer, a separator having means for feeding a supply of fuel gas containing hydrogen gas to one of the electrodes, and another separator having means for feeding a supply of oxidant gas to the other of the electrodes. In the polymer electrolyte fuel cell stack, a sealing portion is disposed at least in the vicinity of each electrode. The polymer electrolyte fuel cell stack of the present invention has excellent durability and productivity. Gasket sealing portions, a sealing portion for cooling water, and sealing portions for water and gas in an internal humidifying unit are constituted by a polymer compound that has polyisobutylene as the backbone structure. This arrangement ensures the high reliability.

1 Claim, 16 Drawing Sheets

F I G. 1 1
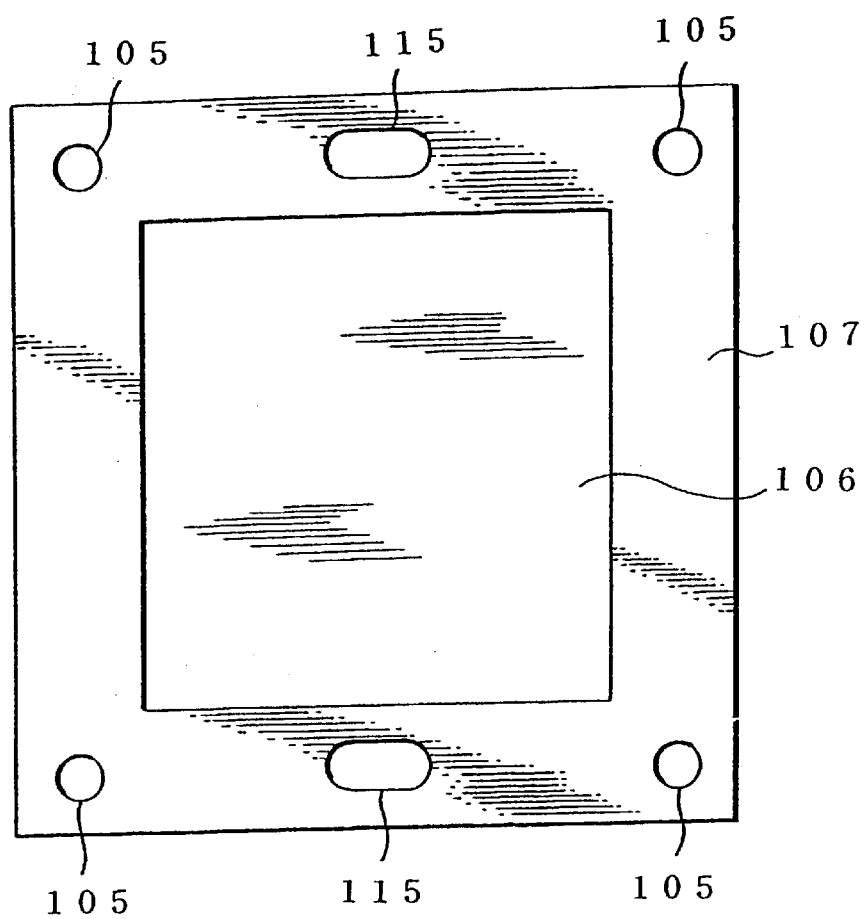

POLYMER ELECTROLYTE FUEL CELL STACK

This application is a continuation of PCT/JP99/02832 May 27, 1999.

TECHNICAL FIELD

The present invention relates to a polymer electrolyte fuel cell stack that works at ordinary temperature and is used for portable power sources, electric vehicle power sources, and domestic cogeneration systems.

BACKGROUND ART

The polymer electrolyte fuel cell generates the electricity and the heat simultaneously by reacting a fuel such as hydrogen and an oxidant gas such as the air, electrochemically at gas diffusion electrodes with a catalyst like platinum carried thereon.

One example of the polymer electrolyte fuel cell stack is shown in the partially omitted perspective view of FIG. 4.

On the opposite faces of a polymer electrolyte membrane 3, which selectively transports hydrogen ions, catalytic reaction layers 2. which are constituted by carbon powder with a platinum metal catalyst carried thereon, are closely formed. And, according to the requirement, a fluorocarbon water repellent may be added.

The polymer electrolyte used here may be a fluorocarbon polymer with sulfonate groups introduced into the ends of their side chains. This electrolyte has proton conductivity in the wet state. In order to activate the fuel cell, it is accordingly required to keep the polymer electrolyte in the wet state. The polymer electrolyte in the wet state has strong acidity due to $H^{30}$ dissociated from the sulfonate groups at the ends. Accordingly, the acid resistance is required for the material of the portions that are in direct contact with the electrolyte. The equivalent material to the electrolyte is also admixed to the reaction electrodes, so that the acid resistance is required for the material of the portions that are in direct contact with the reaction electrodes.

Further, on the respective outer faces of the catalytic reaction layers 2A, a pair of diffusion layers 1 having both the gas permeability and the electrical conductivity are closely formed. This catalytic reaction layer 2 and the diffusion layer 1 constitute an electrode (an anode or a cathode).

In the case where pure hydrogen is used as the fuel, as a material constituting the anode and cathode, the same material can be used. In the case where the fuel is a gas mainly containing hydrogen, which is obtained by reforming a hydrocarbon fuel, carbon monoxide is naturally contained in the reformed gas. In order to prevent the noble metal catalyst from being poisoned with carbon monoxide, there is a proposal to add an anti-CO poisoning substance, such as ruthenium only to the anode side.

Outsides of the electrode, conductive separator (bi-polar) plates 4 are further arranged so as to mechanically fix the assembly of these electrolyte membrane and the electrodes and connect adjoining assemblies electrically with each other in series. In a portion of the separator plate 4 that is in contact with the electrode, a gas flow path 5 is formed to feed the supply of the reaction gas to the surface of the electrode and flow out the gas evolved by the reaction and the remaining excess gas. And, the gas manifolds 8, which supply a gas to and exhaust a gas from the fuel cells, and water manifolds 14, which supply water for cooling the fuel cell stack down and exhausts the water. A cooling means such as a cooling plate may be provided to the separator plate 4 may have.

In order to prevent the hydrogen gas and the air from being leaked from the cell laminate or from being undesirably mixed with each other, an internal sealing structure is general one, in which sealing portions or O-rings are disposed around the electrodes across the polymer electrolyte membrane.

Since the above-mentioned proton-conductive electrolyte has strong acidity, a fluorocarbon polymer material having high acid resistance is employed for sealing portions like gaskets that are in direct contact with the electrolyte.

With a view to maximizing the area of the electrodes, an external sealing structure may in adopted, which does not use the sealing portions or O-rings around the electrodes but extends the ends of the electrodes to the side face of the cell laminate and seal the side face of the cell laminate with an air-tight non-conductive material.

The polymer electrolyte fuel cell stacks of the external sealing structure are divided into an internal manifold type and an external manifold type. In the internal manifold type, the manifolds or gas flow paths for feeding a supply of gas to the respective unit cells are formed inside the cell laminate in the form of through apertures that pass through the constituents of the cell laminate such as separators. In the external manifold type, on the other hand, the manifolds are arranged outside the cell laminate.

In the prior art method wherein a solution obtained by dissolving a resin in a solvent is applied and dried or a reactive resin is applied and solidified in order to form the gas seal portion that covers the side face of the cell laminate, however, there is a problem that the sufficient gas sealing property cannot be given.

When the manifolds, which connects with gas inlets and outlets, are provided, the significant unevenness on the surface of the gas seal formed by the resin makes it difficult to ensure the favorable gas sealing property at a portion where the side face of the cell laminate is in contact with the manifold.

For example, there is a method which casts a thermosetting resin such as an epoxy resin into a cast mold which envelopes the cell laminate to integrally mold, but solidification of the resin takes time to bring about poor productivity.

Any of the above method has another problem that the gas inlets and outlets are closed by the air-tight non-conductive material.

Around the electrodes, sealing portions like gaskets are disposed and sandwiched between a pair of separator plates in order to prevent the reaction gases fed to the cathode and the anode from being leaked. The prior art technique arranges hard gaskets composed of, for example, a fluorocarbon resin, around the peripheral portion of the electrodes and subsequently places a pair of separator plates across the gaskets and, therefore, there needs the accurate adjustment of the thickness of the electrodes and the gaskets.

In the case where the gaskets have rubber-like elasticity, however, the strict size accuracy is not required, but the function of the gaskets can be attained by ascertain level of adjustment of the thickness. The properties required for the gaskets thus include acid resistance and the rubber-like elasticity. Although having the poorer acid resistance than the fluorocarbon resin, ethylene-propylene-diene rubber (EPDM) having elasticity is sometimes used for the material of the gaskets.

The separator plates are directly in contact with the electrodes and are thereby required to have high gas tightness and electrical conductivity, as well as the acid resistance. When the air is used as the oxidant gas, it is required to enhance the flow rate of the air supplied to the cathode and to efficiently remove liquid water or water vapor evolved at the cathode. A complicated structure generally called the serpentine-type as shown in FIG. 5 is typically applied for the gas flow path structure in the separator plate. The separator plate is obtained by cutting a carbon material such as a dense carbon plate having gas tightness, a carbon plate impregnated with a resin, or glassy carbon to a desired shape and forming grooves for gas flow paths. In another example, the separator may be obtained by processing and plating a corrosion-resistant alloy plate with a noble metal on demand.

Also, on demand, the carbon material or the corrosion-resistant metal material may be used only for the portions that are in contact with the electrodes and require the sufficient electrical conductivity. Further, there has been an attempt that the separator plates of a resin-containing composite material may be used for the peripheral portions such as manifolds, which do not require the electrical conductivity. Also, there is suggested that a resin is mixed with carbon powder or metal power and press-molds or injection-molds.

However, the fluorocarbon material is employed for the sealing portions like gaskets, there is a problem of high cost. The fluorocarbon material is generally a very hard resin and requires an extremely large load to clamp the gaskets and sufficiently seal the flow of gas or cooling water. Therefore, there are attempts to use the porous fluorocarbon material or to apply the fluorocarbon paste on the separator plates, which are used in dry or half dry state. The porous fluorocarbon material is, however, expensive. In addition, there is a problem that the sufficient sealing properties cannot be attained when the load applied for clamping is not as large as the level that damages the porosity.

The fluorocarbon paste used for the sealing portions still has high material cost. When dried and cured, the hardness thereof makes it difficult to regulate the thickness at the time of the application. The rubber material like EPDM does not have so high acid resistance as the fluorocarbon resin and is thus not suitable for the long-term use. The general EPDM has thermoplasticity and is deformed with time at the cell-driving temperature as of 80° C. In some cases, there is a problem that the deformation blocks-the gas flow path and lowers the supply of the fuel.

With respect to the material for the separator plates, in the case where the dense carbon plate having gas tightness or glassy carbon is employed for the separator plates, the cutting work is required to form the gas flow paths. This is undesirable from the viewpoints of mass production and manufacturing cost. In the case where the carbon plate impregnated with a resin is used for the separator plates, impregnation of the resin after formation of gas flow paths causes warpage of the carbon plate because of little elasticity of the resin. Post treatment including the work of cutting the gas flow paths should accordingly be required after impregnation of the resin. When a phenol resin or a silicone resin is used as the impregnating material, the sufficient acid resistance cannot be attained. In the case where the corrosion-resistant alloy or the material plated with a noble metal is used, the cutting work is required to form the serpentine flow path structure.

In the case where the mixture of a resin and carbon powder or metal powder is press-molded or injection-molded to separator plates, the resin itself is required to have acid resistance. The fluorocarbon resin or another hard resin material has low fluidity and difficulty in molding. The resin having poor fluidity allows only a low content of the resin in the mixture. In this case, post treatment, for example, impregnating the portions that require the gas tightness with the resin, is required after the molding. This results in the complicated structure.

The object of the present invention is thus to provide a polymer electrolyte fuel cell stack having excellent durability of seals. The object of the present invention is also to provide a method of manufacturing such a polymer electrolyte fuel cell stack with a high productivity.

DISCLOSURE OF THE INVENTION

The present invention relates to a polymer electrolyte fuel cell stack (hereinafter simply referred to as PEFC) comprising a cell laminate having a plurality of unit cells, which are laid one upon another, and each of which includes a polymer electrolyte membrane, a pair of electrodes that are arranged across the polymer electrolyte membrane and respectively have a catalytic reaction layer, a separator having means for feeding a supply of fuel gas containing hydrogen to one of the electrodes, and another separator having means for feeding a supply of oxidant gas to the other of the electrodes, wherein a sealing portion is disposed at least in the vicinity of each electrode.

It is preferable to have the sealing portion over a whole side face of the unit cells. It is also preferable that the separator has cooling means with a sealing portion. It is preferable to have the sealing portion around each electrode or in a space formed in the vicinity of each electrode between the separators. It is preferable to have a humidifying unit that enables heat exchange between a flow of cooling water discharged from the polymer electrolyte fuel cell stack and a flow of fuel gas fed to the polymer electrolyte fuel cell stack and simultaneously carries out heating and humidifying, the humidifying unit having a sealing portion.

Also, it is preferable that the sealing portion is constituted by a polymer compound expressed by Formula (1) given below:

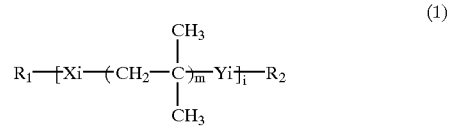

(1)

wherein $R_1$ and $R_2$ are non-functional end groups; Xi and Yi are independently polymerizable functional groups and form crosslinking points after polymerization; m is an integer of not less than 1 and represents a number of repeated isobutylene oligomer units; and i is an integer of not less than 1 and represents the degree of polymerization.

Further, it is preferable that the sealing portion is constituted by a mixture of the polymer compound expressed by Formula (1) given above and an electron-conductive material.

In addition, it is preferable that the separator is constituted by a carbon material or a metal material and a polymer compound expressed by Formula (1) given below:

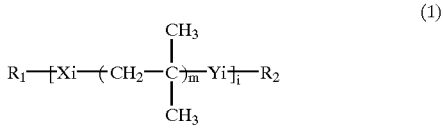

wherein $R_1$ and $R_2$ are non-functional end groups; Xi and Yi are independently polymerizable functional groups and form crosslinking points after polymerization; m is an integer of not less than 1 and represents a number of repeated isobutylene oligomer units; and i is an integer of not less than 1 and represents the degree of polymerization.

Also, it is preferable that the polymerizable functional groups Xi and Yi in Formula (1) given above are independently selected among the group consisting of allyl group, acryloyl group, methacryloyl group, isocyanate group, and epoxy group.

It is also preferable that the number of repeated isobutylene oligomer units m in Formula (1) given above ranges from 56 to 72.

It is further preferable that the degree of polymerization i of the polymer compound in Formula (1) given above is not less than 8000.

Also, it is preferable that at least portion of the sealing portion is formed by injection molding a non-conductive gas-tight material.

Further, it is preferable that at least portion of the sealing portion consists of plural layers, and an outer-most layer thereof is formed by injection molding.

Also, it is preferable that a manifold for feeding the supply of fuel gas or the supply of oxidant gas to each of the electrodes is disposed on a side face of the cell laminate.

It is also preferable that the sealing portion has a three-layered structure, where a heat-resistant hard resin layer is interposed between a pair of elastic resin layers.

It is preferable that the heat-resistant hard resin layer is constituted by a polyethylene terephthalate resin and the elastic resin layer is constituted by a polymer compound expressed by Formula (1) given below:

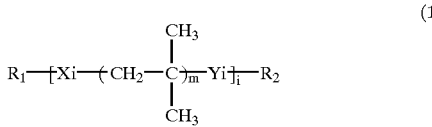

wherein $R_1$ and $R_2$ are non-functional end groups; Xi and Yi are independently polymerizable functional groups and form crosslinking points after polymerization; m is an integer of not less than 1 and represents a number of repeated isobutylene oligomer units; and i is an integer of not less than 1 and represents the degree of polymerization.

BRIEF DESCRIPTION OF THE DRAWINGS

FIG. 11 is a top view schematically illustrating the structure of an MEA in Example 11 of the present invention.

BEST MODES FOR CARRYING OUT THE INVENTION

Figure 1:
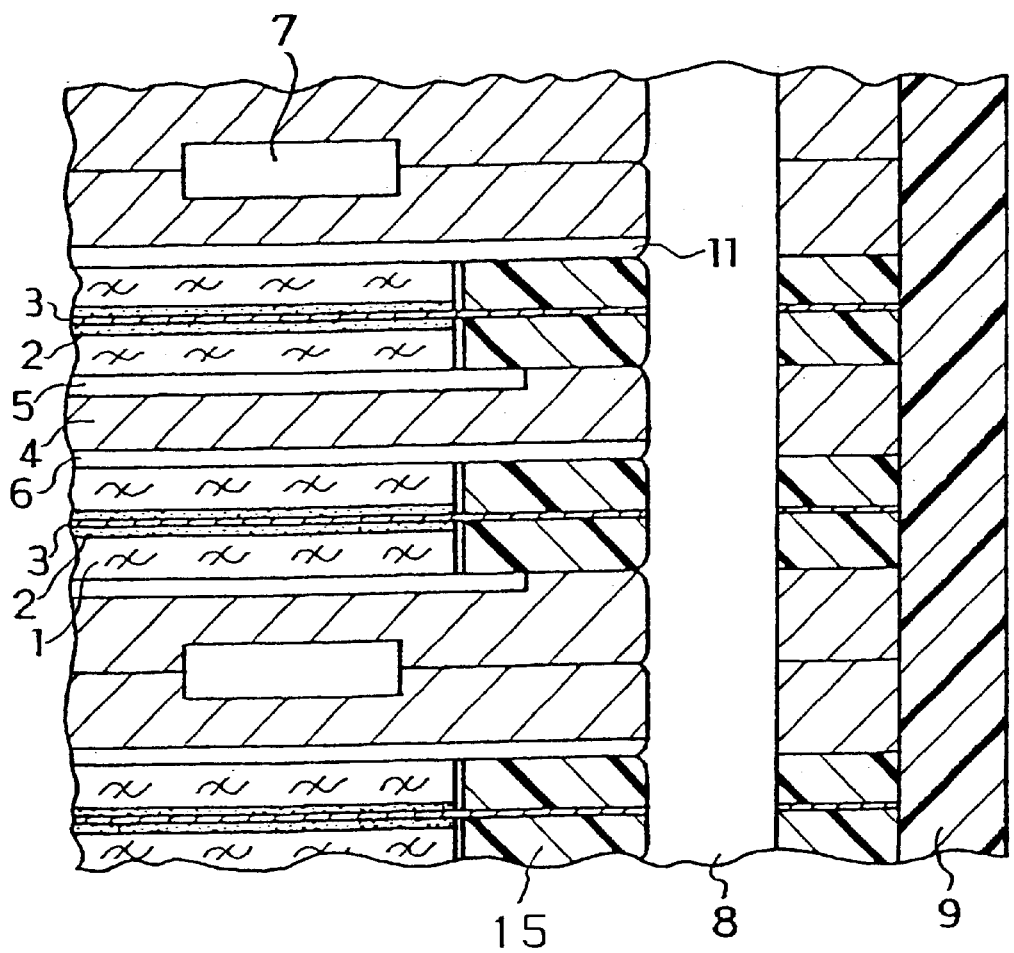
FIG. 1 is a sectional view schematically illustrating a main portion of a PEFC in Example 1 of the present invention.

The present invention is characterized in that a sealing portion is provided at each constituent of a PEFC, in order to prevent gas and water from leaking mainly from electrodes included in the PEFC.

The present invention accordingly relates to a PEFC comprising a cell laminate having a plurality of unit cells, which are laid one upon another and each of which includes a polymer electrolyte membrane, a pair of electrodes that are arranged across the polymer electrolyte membrane and respectively have a catalytic reaction layer, a separator having means for feeding a supply of fuel gas containing hydrogen to one of the electrodes, and another separator having means for feeding a supply of oxidant gas to the other of the electrodes, a sealing portion is provided at least in the periphery of each electrode. As described above, the present invention may be actualized by a variety of applications but is described in detail with two typical embodiments as shown in the followings.

(1) First Embodiment

The present invention provides a PEFC comprising a cell laminate having a plurality of unit cells, which are laid one upon another and each of which includes a polymer electrolyte membrane, a pair of electrodes that are arranged across the polymer electrolyte membrane and respectively have a catalytic reaction layer, means for feeding and distributing a supply of fuel gas containing hydrogen to one of the electrodes, and means for feeding and distributing a supply of oxidant gas to the other of the electrodes, wherein a sealing portion is formed by covering a side face of the cell laminate with a non-conductive gas-tight material.

It is preferable that at least portion of the sealing portion is formed by injection molding a non-conductive, gas-tight material or that at least portion of the sealing portion consists of plural layers and an outer-most layer thereof is formed by injection molding.

Like the prior art PEFC, it is further preferable that a manifold is disposed on the side face of the cell laminate to feed the supply of fuel gas or the supply of oxidant gas to each of the electrodes included in the unit cell.

The present invention also provides a method of manufacturing such a PEFC. The present invention is accordingly directed to a method of manufacturing a PEFC comprising a cell laminate having a plurality of unit cells, which are laid one upon another and each of which includes a polymer electrolyte membrane, a pair of electrodes that are arranged across the polymer electrolyte membrane and respectively have a catalytic reaction layer, means for feeding a supply of fuel gas to one of the electrodes, and means for feeding a supply of oxidant gas to the other of the electrodes comprising the steps of: laying a plurality of unit cells one upon another and mechanically clamping and fixing the layered unit cells from both end faces thereof to obtain a cell laminate; and forming a sealing portion, which comprises a non-conductive gas-tight material, on a side face of the cell laminate, wherein the step of forming the sealing portion includes the step of injection-molding an outer circumference of the cell laminate.

Prior to the step of forming the sealing portion, the step of disposing a manifold on the side face of the cell laminate may be included.

The present invention also provides a method of manufacturing a PEFC comprising a cell laminate having a plurality of unit cells, which are laid one upon another and each of which includes a polymer electrolyte membrane, a pair of electrodes that are arranged across the polymer electrolyte membrane and respectively have a catalytic reaction layer, means for feeding and distributing a supply of fuel gas to one of the electrodes, and means for feeding and distributing a supply of oxidant gas to the other of the electrodes, comprising the step of applying a liquid precursor of a non-conductive gas-tight material on an inner surface of a manifold and making the material dried and solidified to form a sealing portion inside the manifold, while preventing gas inlet and outlet of each unit cell open to the manifold from being blocked by the solidified non-conductive gas-tight material.

In this case, the step of forming the sealing portion inside the manifold may include the steps of: arranging a porous film at the gas inlet and outlet, prior to the application of the liquid precursor; and removing the porous film after the solidification of the liquid precursor.

It is preferable that the forming step of the sealing portion is carried out while the supplies of gases are continuously flown to the means for distributing the respective gases to the electrodes.

In the PEFC of the first embodiment according to the present invention, it is preferable that the sealing portion is integrally formed by applying a mechanically strong resin such as engineering plastics, on the side face of the cell laminate, and such arrangement can provide the PEFC having excellent gas tightness and mechanical strength. This also gives a smooth outer surface, which leads to the favorable appearance and, when forming the sealing portion, facilitates formation of the sealing portion thereon.

If the sealing portion consists of plural layers, which includes an outer-most resin layer formed by injection molding, it preferably further improves the durability of the sealing portion.

For example, the sealing portion comprising a layer composed of a cushioning material that absorbs mechanical shocks can improve the shock resistance of the fuel cell stack.

Since the method of manufacturing the PEFC according to the present invention includes the step of forming the sealing portion by injection-molding the non-conductive gas-tight material, the fuel cell stack having excellent mechanical properties to be manufactured within a short time period.

Also, if the step of arranging a manifold on the side face of the cell laminate is included, prior to the formation of the sealing portion, the sealing portion and the side face of the cell laminate can be preferably formed integrally. And, it is favorable that the process of fixing the manifold can be omitted.

It is preferable that the method of manufacturing the PEFC according to the present invention includes the step of applying a liquid precursor of a non-conductive gas-tight material on an inner surface of a manifold and making the material dried and solidified, so as to form a sealing portion inside the manifold, while preventing gas inlet and outlet of each unit cell open to the manifold from being blocked by the solidified non-conductive gas-tight material. This arrangement assures the inlet and outlet of each gas to and from each unit cell.

In order to form the sealing portion while preventing the gas inlet and outlet from being blocked by the sealing portion, it is preferable to arrange a porous film at the gas inlet and outlet open to the manifold, to make a liquid resin precursor penetrate into the film and enter the clearances of the electrodes and separators, and solidifies the liquid resin material, so as to form the sealing portion.

In this case, due to the surface tension of the liquid precursor, the liquid precursor penetrates into the film not to a level that blocks the fluid inlet and outlet but to a level that enters only the clearances of the electrodes and the separators that are in direct contact and is solidified and, therefore, the fluid inlet and outlet can be ensured by removing the film after the solidification of the liquid precursor.

It is preferable that the sealing portion is formed inside the manifold by applying and drying the resin precursor while the supplies of gases are continuously flown to the means for distributing the respective gases to the electrodes. Application of the resin precursor under the continuous flow of the gas effectively prevents the resin precursor from entering the fluid inlet and outlet, and the fluid inlet and outlet are not blocked if the sealing portion is solidified.

In addition to the above-mentioned methods, there is a method wherein the sealing portion is formed after the fluid inlet and outlet are blocked previously with a solid substance. In this case, the solid substance is removed from the fluid inlet and outlet after the formation of the sealing portion to ensure the gas inlet and outlet.

As the non-conductive gas-tight material, a phenol resin or the like may be employed which becomes the sealing agent when solidified.

As the resin material, a liquid-crystal polymer or the like may be used.

(2) Second Embodiment

The second embodiment of the present invention is a PEFC, in which a pair of electrodes arranged across a polymer electrolyte membrane is interposed between a pair of separator plates that supply and discharge a fuel gas to and from one of the electrodes, and a cooling jig is attached to the separator plate, wherein a sealing portion, which is constituted by a polymer compound having polyisobutylene as a backbone structure expressed by Formula (1) given below:

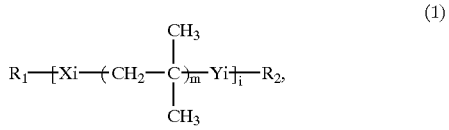

(1)

wherein $R_1$ and $R_2$ are non-functional end groups; Xi and Yi are independently polymerizable functional groups and form crosslinking points after polymerization; m is an integer of not less than 1 and represents a number of repeated isobutylene oligomer units; and i is an integer of not less than 1 and represents the degree of polymerization. is arranged around each of the electrodes to prevent the fuel gas and water produced at the electrodes from leaking outside the fuel cell stack.

It is preferable that the cooling jig has a sealing portion, which is constituted by the polymer compound expressed by Formula (1) given above to prevent the coolant passing through the cooling jig from leaking outside the fuel cell stack.

The sealing portion may be constituted by a mixture of the polymer compound expressed by Formula (1) given above and an electron conductive material.

Further, in the PEFC of the present invention, a sealing portion constituted by the polymer compound expressed by Formula (1) given above is arranged in a clearance in the periphery of the electrodes between the pair of separator plates or in the periphery of the electrodes between the pair of separator plates to prevent the fuel gas and water produced at the electrode from leaking outside the fuel cell stack.

It is preferable that the separator plates are constituted by a mixture of a carbon material or a metal material and the polymer compound expressed by Formula (1) given above.

Also, by providing a humidifying unit that performs heat exchange between a flow of cooling water discharged from the PEFC and a flow of fuel gas fed to the PEFC and simultaneously carries out heating and humidifying and by including a sealing portion constituted by the polymer compound expressed by Formula (1) given above, the cooling water and the fuel gas may be prevented from leaking outside the fuel cell stack.

It is preferable that the polymerizable functional group in Formula (1) given above is allyl group, acryloyl group, methacryloyl group, isocyanate group or epoxy group.

It is also preferable that the number of repeated isobutylene oligomer units m in Formula (1) given above ranges from 56 to 72. It is further preferable that the degree of polymerization i of the polymer compound in Formula (1) given above is not less than 8000.

The sealing portion constituted by the polymer compound expressed by Formula (1) given above is preferably formed by applying a solution containing at least a reactive oligomer expressed by Formula (2)

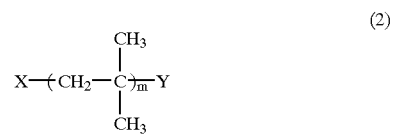

(2)

on a place to be sealed and by curing the reactive oligomer by copolymerization.

Further, according to the present invention, the sealing portions have a three-layered structure in which a heat-resistant hard resin layer is interposed between elastic resin layers may be arranged around the electrodes or in the cooling jig to prevent the fuel gas and the coolant passing through the cooling jig from leaking outside the fuel cell stack.

In this arrangement, it is preferable that the center layer of the sealing portion having the three-layered structure is constituted by a polyethylene terephthalate resin and the outer layers arranged across this are constituted by the polymer compound expressed by Formula (1) given above.

In the PEFC of the second embodiment according to the present invention, the sealing portions for the electrodes, the sealing portion for cooling water and/or the sealing portions for water and gas in the internal humidifying unit are constituted by the polymer compound having polyisobutylene-as the backbone structure expressed by Formula (1) given above, thereby enabling the formation of the sealing portion having acid resistance at a low cost.

In such a method for manufacturing the PEFC, the PEFC can be manufactured at a low cost by applying a solution containing at least the reactive oligomer expressed by Formula (2) given above on a place to be sealed and, then, by copolymerizing and curing the reactive oligomer.

The polymer compound expressed by Formula (1) given above is excellent in acid resistance and inexpensive and has elasticity and heat resistance. This is accordingly better than the fluorocarbon resin or EPDM for the gaskets and the sealing material of the cooling water.

When a carbon plate impregnated with the polymer compound expressed by Formula (1) given above is used as the separator plate, the impregnation of the resin may be carried out after the formation of gas flow path in the non-dense carbon plate, because of the elasticity of the resin. Since the non-dense carbon plate before the impregnation of the resin is more resilient and easily processed than the carbon plate impregnated with the resin, the processing is significantly facilitated.

Further, in the case of mixing carbon powder or metal powder is mixed with the polymer compound expressed by Formula (1) given above and press-molding or injection-molding the mixture, the fluidity in molding can be improved because of the elasticity of the resin. Even when the content of the resin increases, the fluidity in molding is favorable and, therefore, the step such as the post treatment after the molding can be omitted.

Also, when carbon or a metal is used only for the portion that requires the electrical conductivity inside the separator plate and the polymer compound expressed by Formula (1) given above is used for the periphery of the portion having a complicated shape like a manifold and the sealing portion that does not require the electrical conductivity, the rubber-like flexibility of the polymer compound facilitates the sealing.

Even if the carbon or metal material used for the portion that requires the electrical conductivity and the polymer compound expressed by Formula (1) given above and used for the portion that does not require the electrical conductivity have different coefficients of thermal expansion, there is no fear to bring about damage to the separator plate in the course of heating or cooling the fuel cell stack due to the difference between the coefficients of thermal expansion, because of the rubber-like flexibility.

In the above description, the polymer expressed by Formula (1) is obtained by crosslinking a plurality of units at end functional groups portions, where each unit includes the repeated number m of isobutylene oligomers and the end functional groups X and Y added thereto. When allyl group, acryloyl group, methacryloyl group, isocyanate group, and the epoxy group are employed used for X and Y, the resulting polymer that is polymerized at the crosslinking points of X and Y has a network structure crosslinked in matrices because these functional groups are the polyfunctional groups.

At that time, the physical properties of the polymer are significantly affected by the number of repeated isobutylene oligomer units m, the degree of polymerization i, and the end functional groups in the polymer compound expressed by Formula (1) given above.

The present inventors have found, as a result of intensive studies, that the favorable number of repeated isobutylene oligomer units m ranges from 56 to 72 in the polymer compound used for the sealing portions in the PEFC.

It is also found that the repeated number m is preferably 64 on average, and the degree of polymerization i is not less than 8000.

In the followings, the present invention is described with some examples, although the present invention is not at all restricted only thereto.

EXAMPLE 1

Carbon powder having the particle diameter of not greater than several microns was soaked in an aqueous solution of chloroplatinic acid and the platinum catalyst was carried on the surface of the carbon powder by reduction. The weight ratio of carbon to platinum carried thereon was 1:1. Then, the carbon powder with the platinum catalyst carried thereon was dispersed in an alcohol solution of a polymer electrolyte to yield a slurry.

On the other hand, carbon paper having a thickness of 400 $\mu$m, which was the material of electrodes, was impregnated with an aqueous dispersion of a fluorocarbon resin (Neoflon ND-1 manufactured by Daikin Industries Co., Ltd.) and dried and then heated at 400° C. for 30 minutes to give the water repellency.

As shown in FIG. 1, the slurry containing the carbon powder was applied uniformly on a single face of the water-repelled carbon paper to form a catalytic layer 2.

The obtained carbon paper electrode 1 was cut into the size of 10 by 10 cm, whereas a polymer electrolyte membrane 3 was cut into the size of 12 by 12 cm. The process laid a pair of the carbon paper electrodes 1 across the polymer electrolyte membrane 3 in such a manner that the respective catalytic layers 2 of the electrodes 1 were in contact with the polymer electrolyte membrane 3 and dried to yield an electrolyte membrane-electrode assembly (hereinafter referred to as "MEA").

Then the MEA thus obtained was interposed between a pair of carbon separator plates 4 having the air-tightness to assemble a unit cell. The thickness of each separator plate 4 was 4 mm.

In the process of interposing the MEA between the pair of separator plates, polyethylene terephthalate (PET) sheets 15, which had the same outer dimensions as those of the carbon separator plates, were arranged around the electrodes. The PET sheets are hard and do not have sealing properties, but are used as spacers between the carbon separator plates and the electrolyte membrane.

Two unit cells were laid one upon the other to construct a unit cell laminate. In this example, no O rings were used for sealing the cooling unit.

Figure 2:
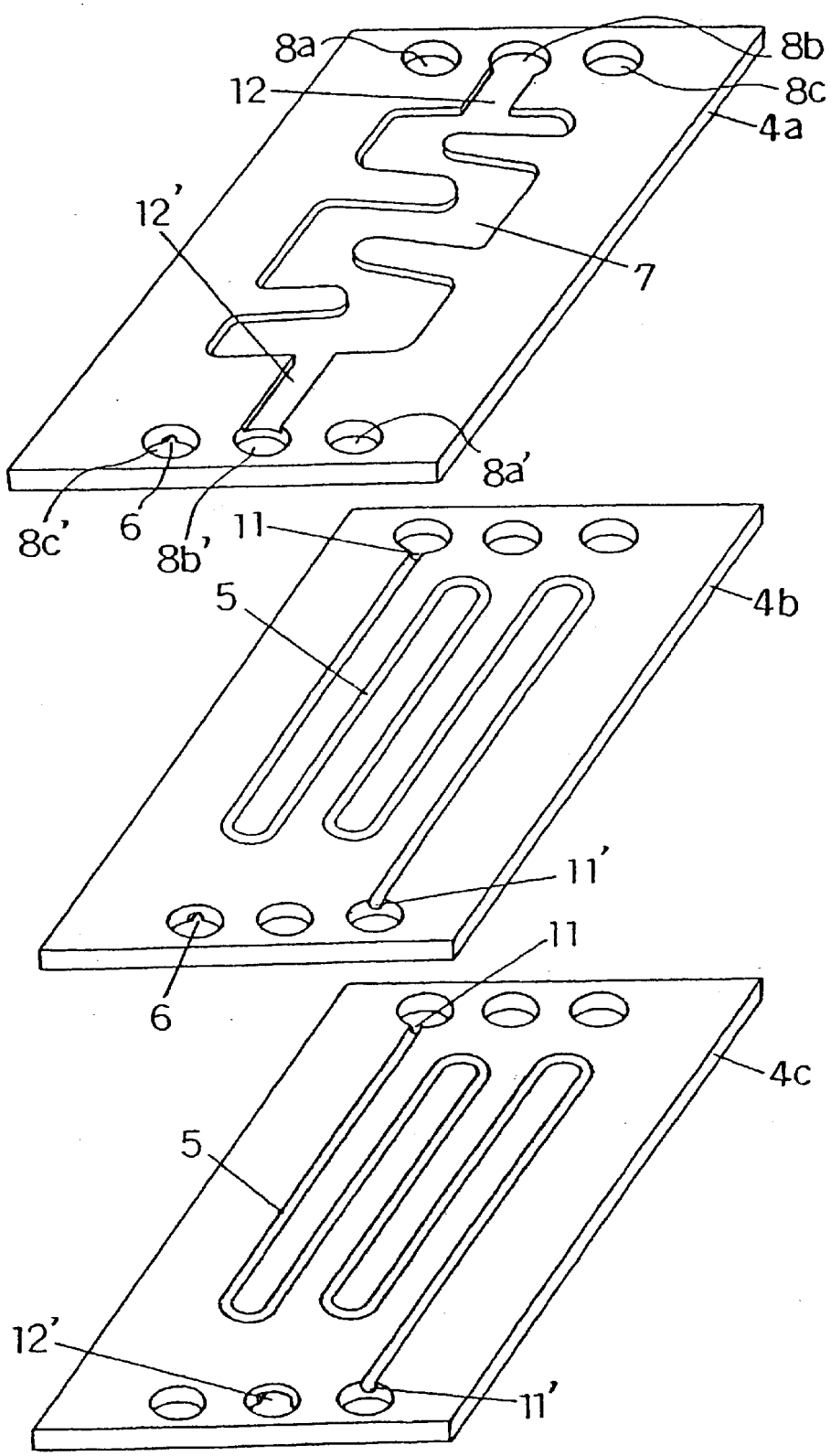
FIG. 2 is a perspective view illustrating separator plates used in the PEFC of FIG. 1.

The separators included in the unit cell laminate are shown in FIG. 2. The used separators here include a separator plate 4a having a cooling water flow path 7 formed in one face thereof and a gas flow path 6 formed in the other face thereof, a separator plate 4b having a gas flow path 5 formed in one face thereof and the gas flow path 6 formed in the other face thereof, and a separator 4c having the gas flow path 5 formed in one face thereof and the cooling water flow path 7 formed in the other face thereof. An inlet 11 and an outlet 11' of the gas flow path 5, an inlet and an outlet of the gas flow path 6, and an inlet 12 and an outlet 12' of the cooling water flow path 7 are constituted on opposite sides.

The gas flow paths 5 and 6 and the cooling water flow path 7 were formed on the surface of the separator by cutting. For example, the gas flow path 5 of this example was formed by cutting a groove of 2 mm in width and 1 mm in depth on the surface of the separator in a shape shown in FIG. 2.

Manifold apertures 8a and 8a' communicating with the gas flow path 5, manifold apertures 8c and 8c' communicating with the gas flow path 6, and manifold apertures 8b and 8b' communicating with the cooling water flow path 7 were formed in the circumferential portion of the separator plates. Lamination of unit cells causes, for example, the manifold apertures 8c to be aligned and form a manifold 8 of the cell laminate. This is true for the other manifold apertures. The supply and discharge of each fluid is flown through each manifold.

In such a manner, by laying 50 unit cells one upon another, placing respective pairs of metal collector plates, insulator plates composed of an electrical insulating material, and end plates in this sequence on both ends of the stack of 50 unit cells, and clamping the end plates with bolts piercing them and nuts, a cell laminate (PEFC) was manufactured. The clamping pressure was 10 kgf/cm$^2$ per area of the separator.

Subsequently a phenol resin solution was charged into the manifold apertures, which were aligned in the cell laminate, from an opening of the manifold 8 located in the end plate, so as to apply the inner surface of the manifold apertures 8 with the phenol resin and dry the phenol resin, thereby forming a sealing portion inside the manifold apertures 8, except the gas inlet and outlet 11 to each unit cell. When the phenol resin solution charged has an excessively high viscosity or when the gas inlet and outlet 11 have excessively small bores, the phenol resin may block the gas inlet and outlet 11. The other manifolds were processed in this manner.

A mold having inner dimensions greater by 6 mm than the outer dimensions of the cell laminate was produced. A resin was injected into a space defined by the mold and electrode end plates of stainless steel at the injection pressure of 100 to 1000 kgf/cm$^2$ and the peak temperature of 300° C., so as to form a resin mold 9 integrally on the side face of the cell laminate. The resin used here was one of liquid-crystal polymers and sold under the name of Zenite HX6130 by du Pont Corp. There were 2 to 32 openings for injection formed in the circumferential portion of the mold.

The excessively large injection pressure or the excessively low temperature in the course of resin molding may cause a damage or deformation of the resulting fuel cell stack. The insufficient injection pressure, on the other hand, causes the whole surface not to be covered with the resin or results in insufficient gas sealing properties. The extremely high temperature still allows the injection molding but lowers the performance of the resulting fuel cell stack. This is ascribed to denaturation of the electrodes due to heat.

The injection molding was performed with a variety of resins, such as nylon resin having a lower injection temperature, other than the above resin.

AS the result of a performance test of the fuel cell stacks injection-molded in the above manner, the fuel cell stack manufactured under the optimized conditions of injection molding (that is, the injection pressure of 500 kgf/cm$^2$, the injection temperature of 200° C., the die temperature of 120° C.) had equivalent initial performance (0.65 V–0.6 A/cm$^2$) to that of the prior art fuel cell stack prepared by applying and drying only a phenol resin on the outer surface of the cell laminate.

The fuel cell stack injection-molded in the above manner was then subjected to a durability test. The fuel cell stack was kept in an environment of 80° C. and relative humidity of 90% and evaluated periodically. For the purpose of comparison, the prior art fuel cell stack prepared by applying and drying only a phenol resin on the outer surface of the cell laminate was also evaluated in the same manner.

As the result, whereas the prior art fuel cell stack had lowered performance after being left in the above environment for 150 hours, the fuel cell stack of the present invention did not have such lowered performance but showed excellent durability.

EXAMPLE 2

A cell laminate of this example was prepared in the same manner as Example 1. Then, after applying and drying butadiene rubber dissolved in a solvent on the outer surface of the cell laminate, a PEFC was manufactured in the same manner as Example 1. The PEFC was kept under vibrations for evaluation of the durability and, as the result, the cell performance after the vibration test was substantially the same as the cell performance before the vibration test. This may be ascribed to that butadiene rubber functions as a cushioning material against the mechanical strength.

Comparative Example 1

The PEFC manufactured in Example 1 was kept under vibrations in the same manner as Example 2. As the result, the cell performance after the vibration test was lower than the cell performance before the vibration test. A peel of the sealing surface was observed in the decomposed PEFC. It is regarded that the gas was leaked therefrom.

EXAMPLE 3

Figure 3:
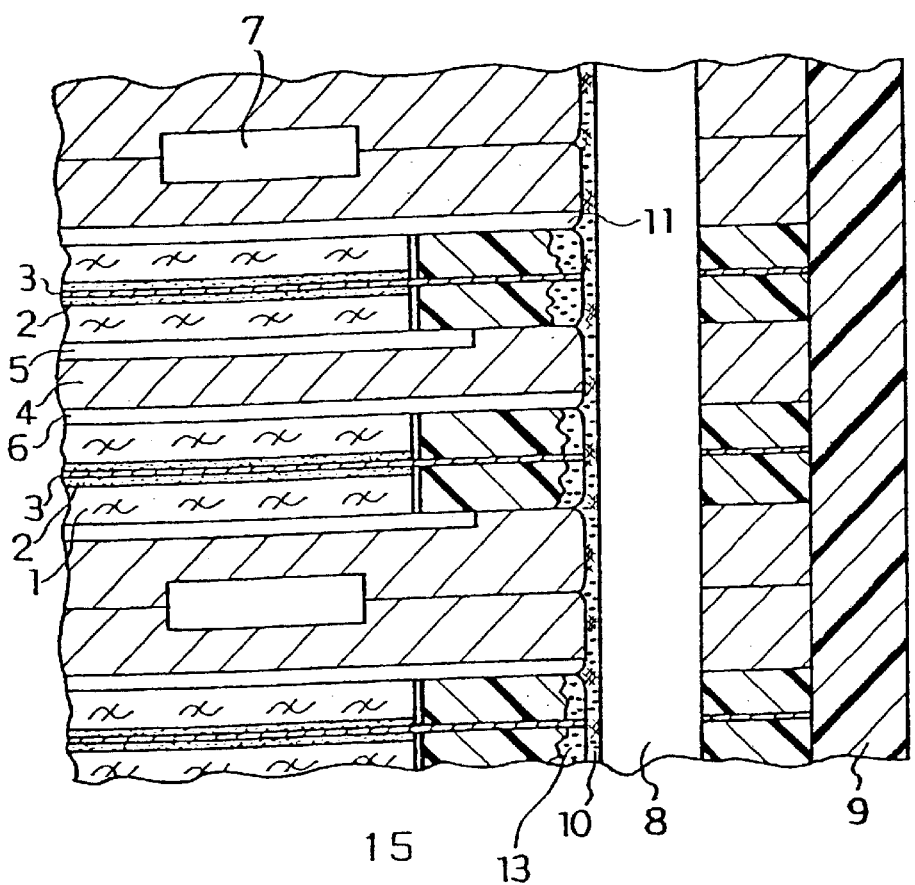
FIG. 3 is a sectional view schematically illustrating a main portion of a PEFC in Example 3 of the present invention.
Figure 4:
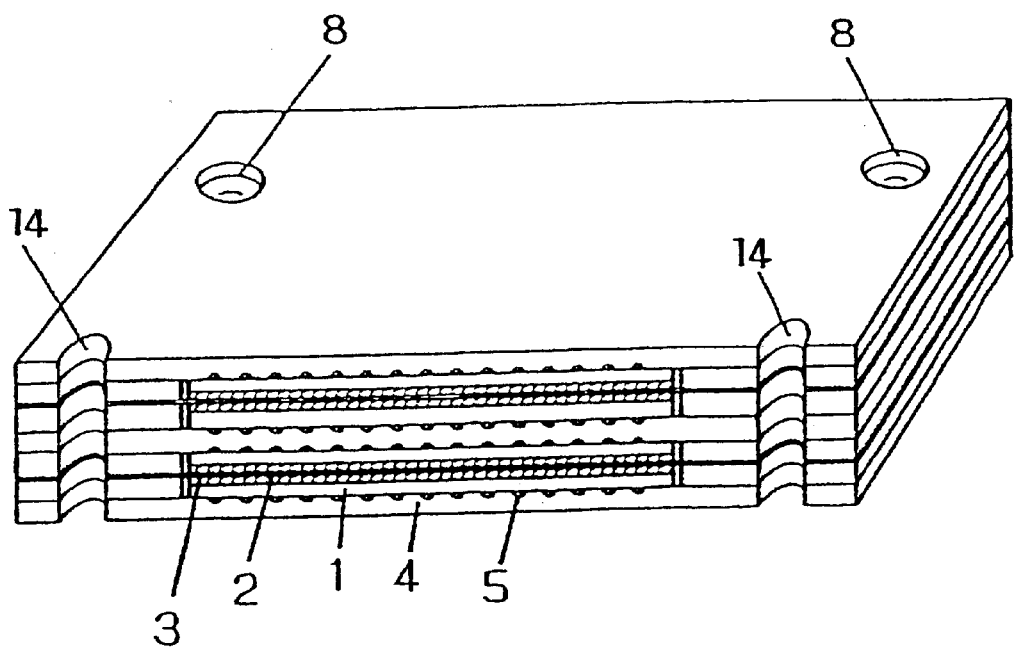
FIG. 4 is a perspective view schematically illustrating a PEFC of the present invention.

A cell laminate of this example was prepared in the same manner as Example 1 and a porous film 10, which was a glass fiber film, was attached on a wall face, to which the gas inlet and outlet 11 of the manifold apertures 8 were open, as shown in FIG. 3. In the same manner, the porous film was attached inside the manifold apertures of the other fluids.

Subsequently, a phenol resin solution, which was obtained by dissolving phenol resin powder in an organic solvent and adjusting the viscosity, was charged from an opening of the manifold placed in the end plate to penetrate into the porous film 10.

A phenol resin 13 passed through the porous film 10 and reached the side face of the cell laminate to enter the clearances of the electrodes and the separators. The porous film 10 was peeled off after the phenol resin 13 was dried and solidified. The solidified phenol resin 13 formed a gas seal inside the manifold. The gas inlet and outlet were not blocked by this resin.

EXAMPLE 4

A PEFC of this example was assembled by embedding Teflon spacers having identical cross sections with those of inlet and outlet of each fluid at the inlet and outlet communicating with the manifold apertures of the respective unit cells in the process of laying 50 unit cells prepared in Example 1 one upon another. At that time, the end of the spacer was projected inside the manifold apertures. A gas sealing portion was prepared by applying and drying the phenol resin in the same manner as Example 3. By removing the Teflon spacers with a jig, the inlet and outlet of each fluid could be ensured.

EXAMPLE 5

A cell laminate of this example was prepared in the same manner as Example 1. While a gas was continuously flown from the inlets of the gases and cooling water, the phenol resin was applied and dried on a specific face of the cell laminate with the outlets of the gases and cooling water. Thereafter, while the flow of the gas was reversed, that is, while the gas was continuously flown from the respective outlets, the phenol resin was applied and dried on a specific face of the cell laminate with the inlets. As the result, the inlets and outlets of gases and cooling water was prevented from being blocked by the resin for gas sealing.

EXAMPLE 6

Acetylene black carbon powder with 25% by weight of platinum particles having an average particle diameter of about 30 angstrom carried thereon was used as a reaction catalyst of the electrodes. This catalyst powder was dispersed in isopropyl alcohol and then mixed with a dispersion, which was prepared by dispersing perfluorocarbon sulfonic acid powder expressed by Formula (3) wherein 1 represents 1 or 2 and m=5 to 13.5, and n≈1000 in ethyl alcohol to yield a paste. A catalyst reaction layer was formed on one face of carbon non-woven fabric (thickness of 250 μm) by means of screen printing method with the paste as the raw material. The quantity control was carried out to make the quantity of platinum included in the resulting electrode equal to 0.5 mg/cm$^2$ and the quantity of perfluorocarbon sulfonic acid equal to 1.2 mg/cm$^2$.

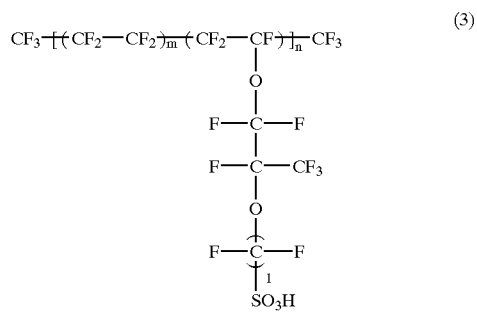

(3)

Figure 5:
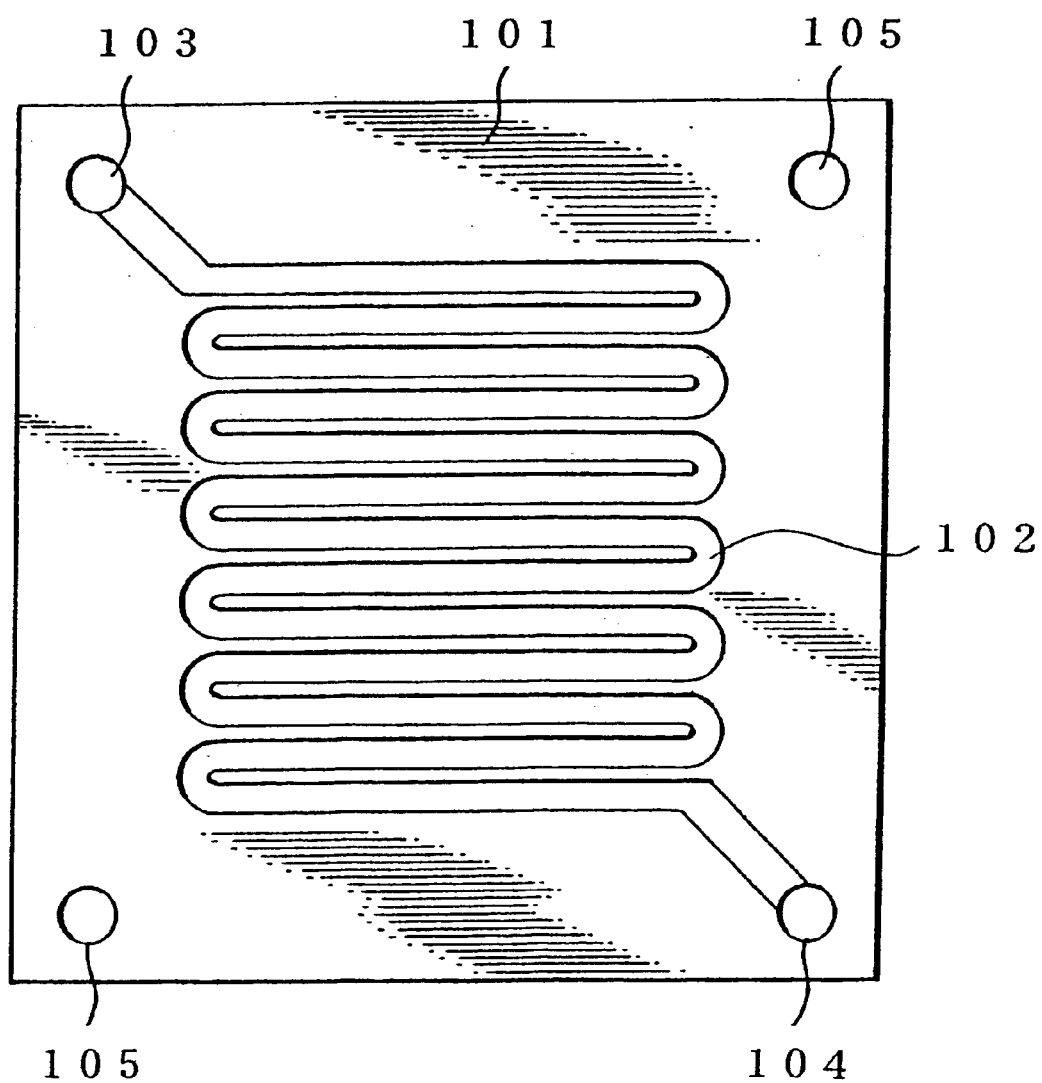
FIG. 5 is a top view schematically illustrating the structure of a separator plate used in Example 6 of the present invention.
Figure 6:
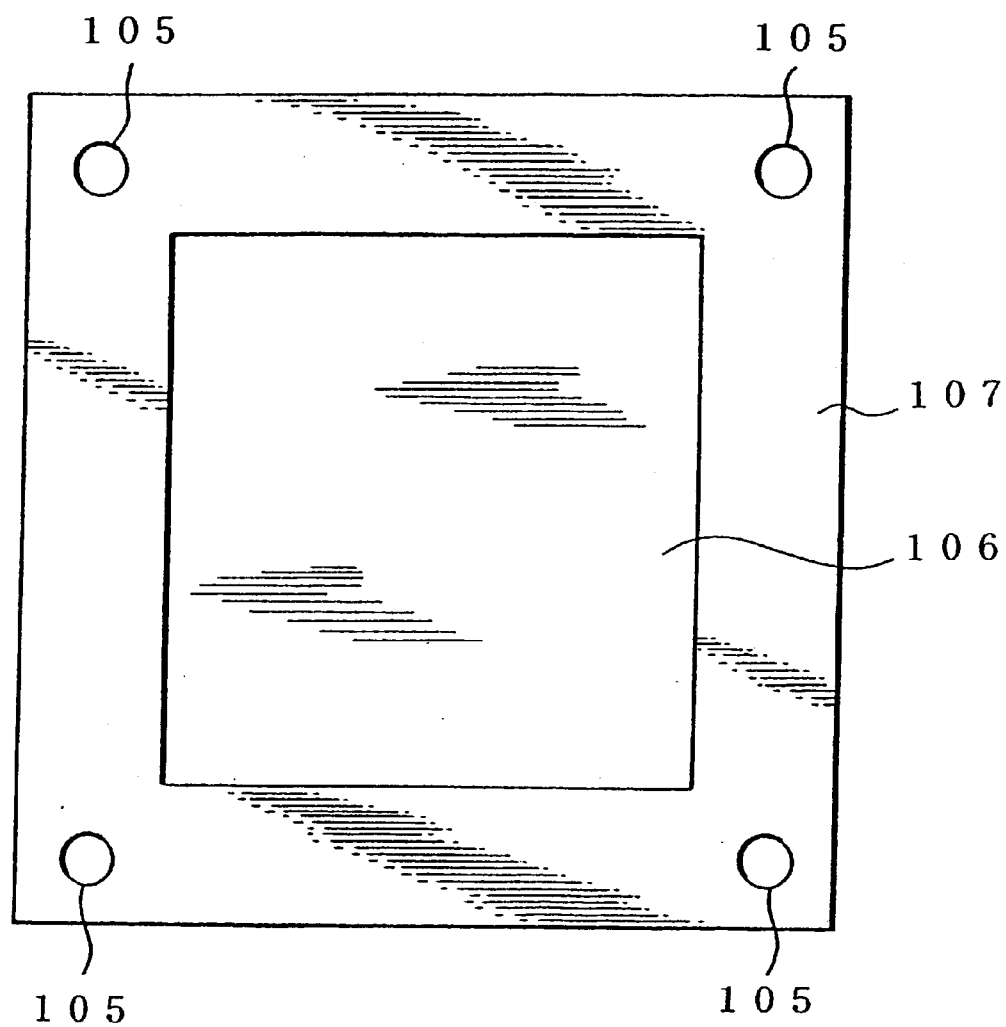
FIG. 6 is a top view schematically illustrating the structure of an MEA with the separator plates in Example 6 of the present invention.
Figure 7:
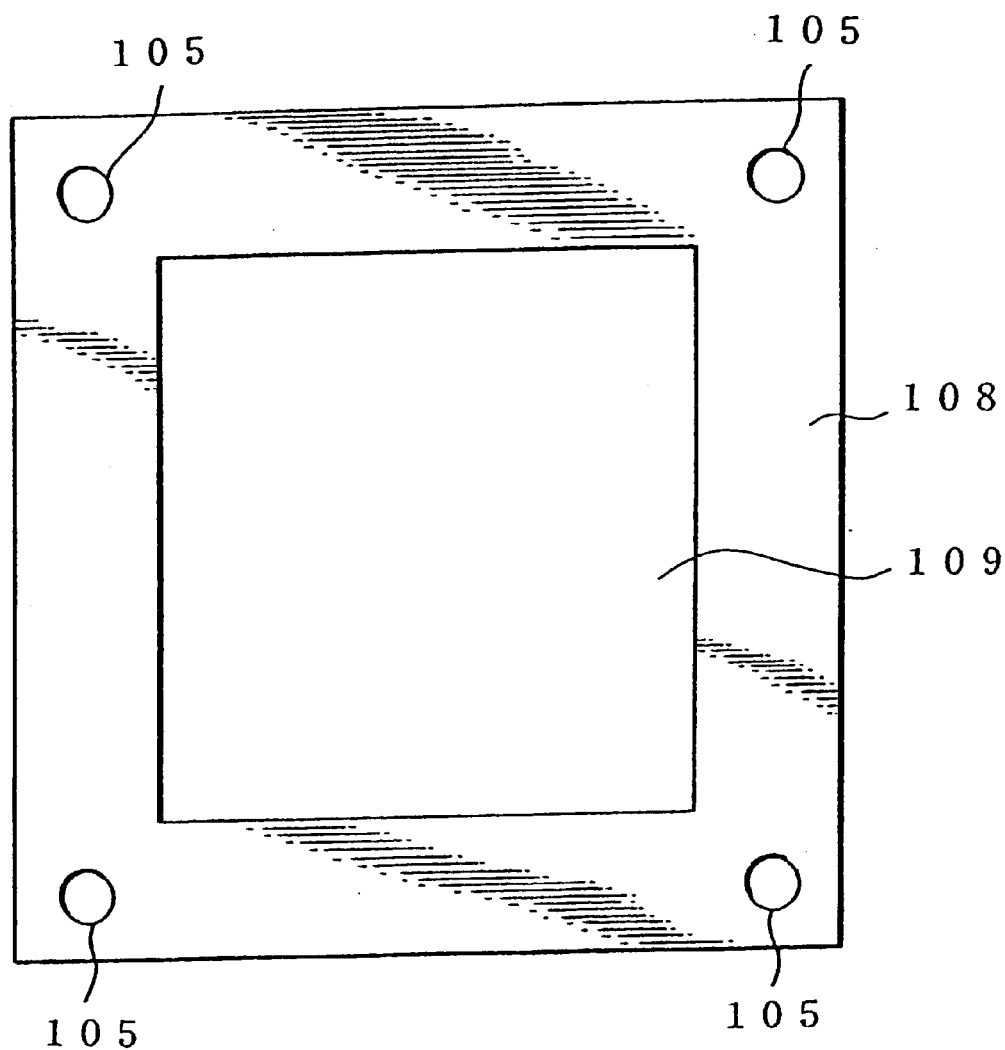
FIG. 7 is a top view schematically illustrating a plate-like molded gasket used in Example 6 of the present invention.

Cathode and anode having the identical configuration discussed above were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode assembly (MEA). In the drawing of FIG. 6, numerals 105, 106, and 107 respectively denote gas manifolds, the electrodes, and the electrolyte membrane. The proton-conductive polymer electrolyte membrane used here was a thin film (25 $\mu$m) of perfluorocarbon sulfonic acid expressed by Formula (3) given above. As shown in FIG. 7, the process subsequently formed a plate-like molded gasket seal 108 with apertures 105 and 109 for the manifolds and the electrodes. The electrolyte membrane of the MEA over the area of the electrodes was interposed between two gasket seals, in such a manner that the electrodes of the MEA were fitted in the apertures 109 for the electrodes formed on the center of the gasket seals 108. Further, the MEA and gasket seals were then interposed between two separator plates that had a shape shown in FIG. 5 and comprised a non-porous carbon material, in such a manner that the gas flow paths formed in the respective separator plates faced each other to constitute a PEFC. In FIG. 5, numerals 101, 102, 103, and 104 respectively denote the separators, a groove for the gas flow path, a gas inlet manifold, and a gas outlet manifold.

On the both faces of the PEFC, by attaching respective pairs of heater plates, collector plates, insulator plates, and end plates with apertures for the manifolds and clamping the outer-most end plates with bolts, springs, and nuts under the pressure of 20 kg/cm$^2$ per the area of the electrodes, a unit cell structure of the PEFC was constituted.

The plate-like molded gasket seal was obtained by forming the required apertures in a plate of 250 $\mu$m in thickness and composed of the polymer compound expressed by Formula (1) given above.

While the PEFC manufactured in the above manner was kept at 75° C., hydrogen gas humidified and heated to have the dew point of 73° C. was fed to one of the electrodes and the air humidified and heated to have the dew point of 68° C. was fed to the other of the electrodes. As the result, a cell open voltage of 0.98 V was given under the non-loading condition that did not output the electric current to the outside.

Although gas leak from the gasket seals portion (periphery) of the PEFC was measured, there was no leak. The PEFC was subjected to a continuous power generation test under the conditions of the fuel utilization of 80%, the oxygen utilization of 40%. and the current density of 0.3 A/cm$^2$. This PEFC kept the cell voltage of or over 0.7 V over 5000 hours.

PEFCs of comparative examples were prepared with plate-like molded gasket seals, where were respectively comprising a silicone resin expressed by Formula (4)

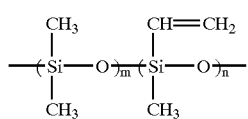

wherein m and n are integers of not less than 1, EPDM, and polytetrafluoroethylene, in place of the polymer compound expressed by Formula (1) given above and were also subjected to the power generation test.

As the result, the PEFC using the gasket seals of the silicon resin showed favorable properties at the initial stage, but a leak of hydrogen gas from the gasket seal was observed after the elapse of approximately 2000 hours. Denaturation of the silicone gasket was observed in the decomposed PEFC.

The PEFC using the gasket seals of EPDM also showed favorable properties at the initial stage, but the generation of the cell voltage suddenly stopped after the elapse of approximately 200 hours. The observation of the decomposed PEFC showed that the EPDM gasket sagged to block the gas flow path.

The PEFC using polytetrafluoroethylene had a leak of hydrogen gas from the gasket even immediately after the assembly.

The polymer compound expressed by Formula (1) and used in this example was obtained by polymerizing the isobutylene oligomer expressed by Formula (2) wherein the number of m was in the range of 56 to 72 with 64 on average and both the functional groups X and Y were allyl groups by irradiation of electron rays under the conditions of the accelerating voltage of 200 keV and the exposed dose of 10 Mrad. The degree of polymerization was approximately ten thousand.

The number of repeated isobutylene oligomer units m of less than 56 gave a hard polymer, which required a greater clamping pressure to prevent leaks of hydrogen gas from the gasket seals of the assembled PEFC. The number m of greater than 72, on the other hand, gave an excessively soft polymer, which gave a leak of hydrogen gas from the -gasket seal after the elapse of approximately 2000 hours in the cell performance test.

The irradiation of electron rays was regulated to examine the effect of the degree of polymerization. The degree of polymerization of less than 8000 resulted in an excessively soft polymer, which gave a leak of hydrogen gas from the gasket seal in the cell performance test.

It was confirmed that the polymer compounds that respectively contained the acryloyl groups, the methacryloyl groups, the isocyanate groups, and the epoxy groups as the end functional groups and were cured by the suitable polymerization reactions were also usable. Irradiation of electron rays was used in the case of the acryloyl groups and the methacryloyl groups as the end functional groups, and the urethane bonding was formed by the water content in the case of the isocyanate groups. In the case of the epoxy groups, the polymer was cured with a known amine curing agent, such as ethylenediamine. However, it was confirmed that, like the polymer compound having the allyl groups as the functional groups, these polymer compounds effectively prevented gas leaks over a long time period, when the number of repeated isobutylene oligomer units m expressed by Formula (2) was adjusted to the range of 56 to 72 and the degree of polymerization was not less than 8000.

EXAMPLE 7

Acetylene black carbon powder with 25% by weight of platinum particles having an average particle diameter of about 30 angstrom carried thereon was used as a reaction Catalyst of the electrodes. Into a solution of the catalyst powder dispersed in isopropyl alcohol, a dispersion which was prepared by dispersing perfluorocarbon sulfonic acid powder expressed by Formula (3) in ethyl alcohol is added to yield a paste. A catalyst reaction layer was formed on one face of carbon non-woven fabric having a thickness of 250 $\mu$m by means of screen printing method with the paste. The quantity control was carried out to make the quantity of platinum included in the resulting electrode equal to 0.5 mg/cm$^2$ and the quantity of perfluorocarbonsulfonic acid equal to 1.2 mg/cm$^2$.

Cathode and anode having the identical configuration discussed above were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode assembly (MEA). The proton-conductive polymer electrolyte membrane used here was a thin film having a thickness of 25 $\mu$m of perfluorocarbonsulfonic acid expressed by Formula (3) given above.

As shown in FIG. 7, a gasket-like molded seal which had apertures for the manifolds and the electrodes and molded in the plate-like form. The electrolyte membrane of the MEA over the area of the electrodes was interposed between two gasket seals, in such a manner that the electrodes of the MEA were fitted in the apertures for the electrodes formed on the center of the gasket seals. Further, the MEA and gasket seals were then interposed between two separator plates that had a shape shown in FIG. 5 and were composed of a non-porous carbon plate as the material, in such a manner that the gas flow paths formed in the respective separator plates faced each other to constitute a PEFC.

On both faces of the PEFC, by attaching heater plates, collector plates, insulator plates, and end plates with required apertures for the manifolds and clamping the outermost end plates with bolts, springs, and nuts under the pressure of 20 kg/cm$^2$ per the area of the electrodes, a unit cell structure of the PEFC was constituted.

The plate-like molded gasket used here was prepared by forming the required apertures in a three-layered structure, where a center layer of a heat-resistant polyethylene terephthalate (PET) resin having a thickness of 150 $\mu$m was interposed between EPDM layers having a thickness of 50 $\mu$m.

While the PEFC manufactured in the above manner was kept at 75° C., hydrogen gas humidified and heated to have the dew point of 73° C. was fed to one of the electrodes and the air humidified and heated to have the dew point of 68° C. was fed to the other of the electrodes. This gave a cell voltage of 0.98 V under the non-loading condition. Although the test of gas leak from gasket portion (periphery) of the PEFC was measured, there was no leak detected. As the result that the PEFC was subjected to a continuous power generation test under the conditions of the fuel utilization of 80%, the oxygen utilization of 40%, and the current density of 0.3 A/cm$^2$, this PEFC kept the cell voltage of or over 0.7 V over 5000 hours, enabling power generation without any deterioration of the cell voltage.

EXAMPLE 8

In first, acetylene black carbon powder with 25% by weight of platinum particles (average particle diameter of about 30 angstrom) carried thereon was used as a reaction catalyst of the electrodes. Into a solution of the catalyst powder dispersed in isopropyl alcohol, a dispersion which was prepared by dispersing perfluorocarbonsulfonic acid powder expressed by Formula (3) in ethyl alcohol was dispersed to yield a paste. A catalyst reaction layer was formed on one face of carbon non-woven fabric having a thickness of 250 $\mu$m by means of screen printing with the paste. The quantity control was carried out to make the quantity of platinum included in the resulting electrode equal to 0.5 mg/cm$^2$ and the quantity of perfluorocarbonsulfonic acid equal to 1.2 mg/cm$^2$.

Cathode and anode having the identical configuration discussed above were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode assembly (MEA). The proton-conductive polymer electrolyte membrane used here was a thin film having 25 $\mu$m of perfluorocarbonsulfonic acid expressed by Formula (3) given above.

As shown in FIG. 7, a gasket-like molded seal which had apertures for the manifolds and the electrodes and molded in the plate-like form. The electrolyte membrane of the MEA over the area of the electrodes was interposed between two gasket seals, in such a manner that the electrodes of the MEA were fitted in the apertures for the electrodes formed on the center of the gasket seals. Further, the MEA and gasket seals were then interposed between two separator plates that had a shape shown in FIG. 5 and were composed of a non-porous carbon plate as the material, in such a manner that the gas flow paths formed in the respective separator plates faced each other to constitute a PEFC.

On both faces of the PEFC, by attaching heater plates, collector plates, insulator plates, and end plates with required apertures for the manifolds and clamping the outermost end plates with bolts, springs, and nuts under the pressure of 20 kg/cm$^2$ per the area of the electrodes, a unit cell structure of the PEFC was constituted.

The plate-like molded gasket seal used here was prepared by forming the required apertures in a three-layered structure, where a center layer of a heat-resistant polyethylene terephthalate (PET) resin having a thickness of 100 $\mu$m was interposed between layers of 75 $\mu$m in thickness composed of the polymer compound expressed by Formula (1) given above. The total thickness of the plate-like molded gasket seal was 250 $\mu$m.

While the PEFC manufactured in the above manner was kept at 75° C., hydrogen gas humidified and heated to have the dew point of 73° C. was fed to one of the electrodes and the air humidified and heated to have the dew point of 68° C. was fed to the other of the electrodes. This gave a cell voltage of 0.98 V under the non-loading condition. Although the test of gas leak from gasket portion (periphery) of the PEFC was measured, there was no leak detected. As the result that the PEFC was subjected to a continuous power generation test under the conditions of the fuel utilization of 80%, the oxygen utilization of 40%, and the current density of 0.3 A/cm$^2$, this PEFC kept the cell voltage of or over 0.7 V over 5000 hours, enabling power generation without any deterioration of the cell voltage.

EXAMPLE 9

In first, acetylene black carbon powder with 25% by weight of platinum particles (average particle diameter of about 30 angstrom) carried thereon was used as a reaction catalyst of the electrodes. Into a solution of the catalyst powder dispersed in isopropyl alcohol, a dispersion which was prepared by dispersing perfluorocarbonsulfonic acid powder expressed by Formula (3) in ethyl alcohol was dispersed to yield a paste. A catalyst reaction layer was formed on one face of carbon non-woven fabric having a thickness of 250 $\mu$m by means of screen printing with the paste. The quantity control was carried out to make the quantity of platinum included in the resulting electrode equal to 0.5 mg/cm$^2$ and the quantity of perfluorocarbonsulfonic acid equal to 1.2 mg/cm$^2$.

Cathode and anode having the identical configuration discussed above were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode assembly (MEA). The proton-conductive polymer electrolyte membrane used here was a thin film having 25 µm of perfluorocarbonsulfonic acid expressed by Formula (3) given above.

Figure 8:
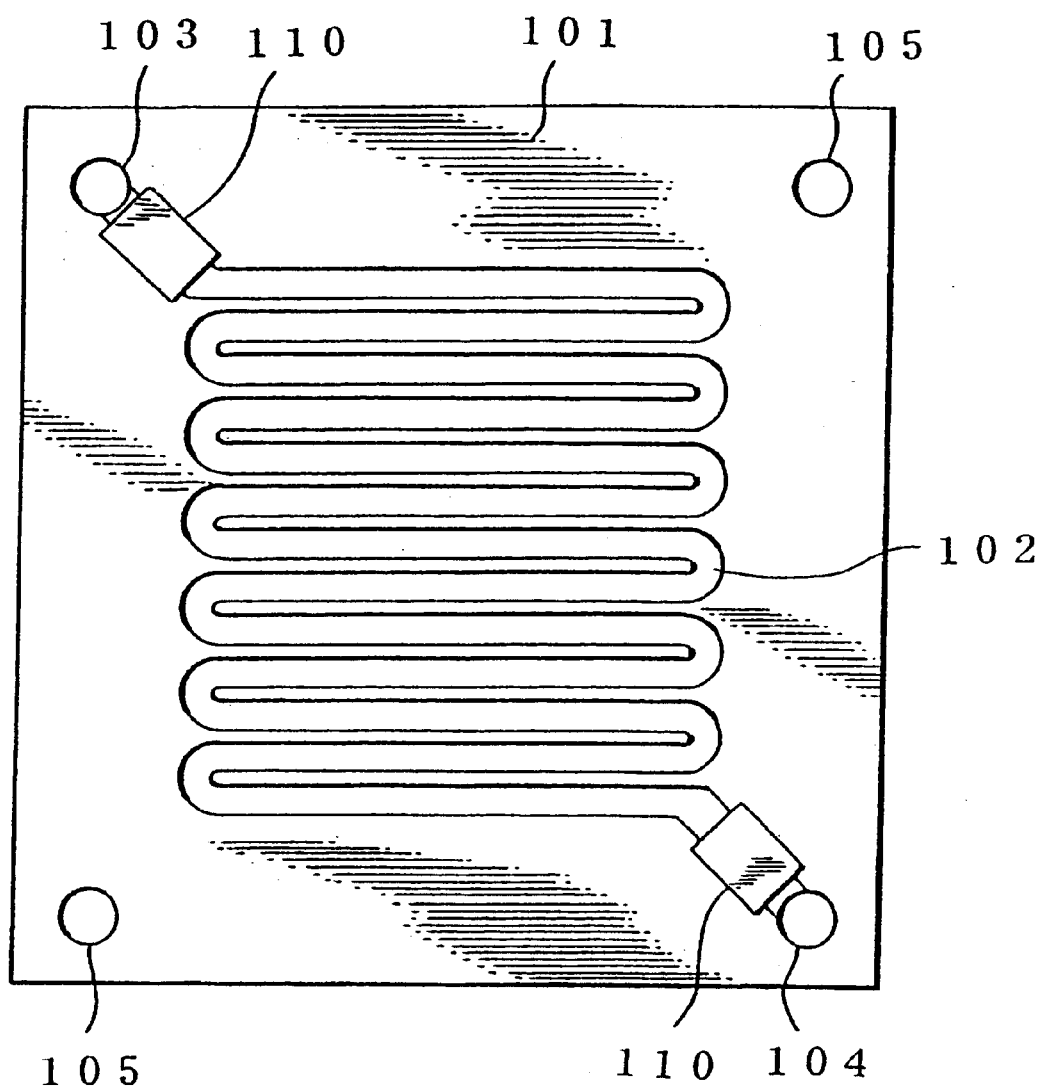
FIG. 8 is a top view schematically illustrating the structure of a separator plate used in Example 9 of the present invention.

FIG. 8 shows the separator plate 101 comprising the non-porous carbon plate and used in this example. A gas flow path bridge 110 made of a non-porous carbon thin plate to make a gas flow path was formed on the upper side of the gas flow path groove 102, through which the gas was introduced from the gas inlet manifold 103 to the surface of the electrode. In the case where the plate-like molded article used in Examples 6 through 8 was used for the gasket seals, the gas flow path bridge shown in FIG. 8 was not required as long as means for preventing the gasket from sagging into the gas flow path is provided by the method of the present invention.

Figure 9:
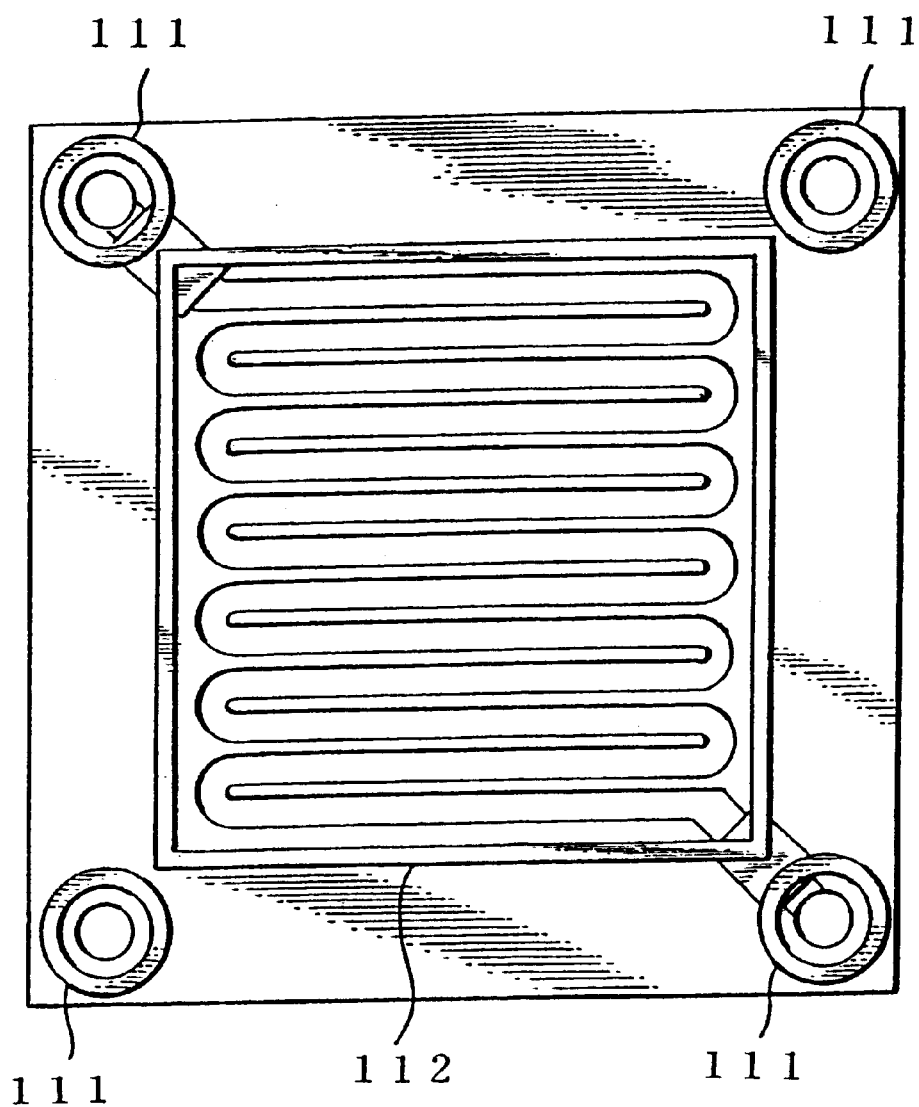
FIG. 9 is a top view schematically illustrating the structure of the separator plate used in Example 9 of the present invention.

A mixed solution of the reactive oligomer expressed by Formula (2) and cyclohexane (the weight ratio of the mixture was 10:2) was applied on the periphery of the manifolds and the electrodes in the separator plates shown in FIG. 8. The mixed solution was also applied at specific sites 111 and 112 shown in FIG. 9 to a thickness of 300 µm. The mixed solution was heated at 85° C. for 48 hours to be cured. Before the reactive oligomer expressed by Formula (2) was completely cured, the MEA was interposed between two separator plates having the structure of FIG. 9 in such a manner that the gas flow paths formed in the respective separator plates faced each other to give a polymer electrolyte fuel cell stack (PEFC).

On both faces of the PEFC, by attaching heater plates, collector plates, insulator plates, and end plates with required apertures for the manifolds and clamping the outermost end plates with bolts, springs, and nuts under the pressure of 20 kg/cm² per the area of the electrodes, a unit cell structure of the polymer electrolyte fuel cell was constituted.

While the PEFC manufactured in the above manner was kept at 75° C., hydrogen gas humidified and heated to have the dew point of 73° C. was fed to one of the electrodes and the air humidified and heated to have the dew point of 68° C. was fed to the other of the electrodes. This gave a cell voltage of 0.98 V under the non-loading condition. Although the test of gas leak from gasket portion (periphery) of the IPEFC was measured, there was no leak detected. As the result that the PEFC was subjected to a continuous power generation test under the conditions of the fuel utilization of 80%, the oxygen utilization of 40%, and the current density of 0.3 A/cm², this PEFC kept the cell voltage of or over 0.7 V over 7000 hours, enabling power generation without any deterioration of the cell voltage.

The polymer compound expressed by Formula (1) having polyisobutylene as the backbone structure and used in this example was obtained by polymerizing the compound expressed by Formula (2) wherein the repeated isobutylene oligomer units m was in the range of 56 to 72 with 64 on average and both the functional groups X and Y were allyl groups by adding 0.2% by weight of benzoyl peroxide as a polymerization initiator to the isobutylene oligomer through radical polymerization under the application of heat. After the curing, the degree of polymerization of the cured polymer was approximately 9000. Another known chemical, such as azobisisobutyronitrile, may be used as the polymerization initiator.

The number of repeated isobutylene oligomer units m of less than 56 gave a hard polymer, which resulted in a leak of hydrogen gas from the gasket seal immediately after the assembly of the PEFC. The number m of greater than 72, on the other hand, gave an excessively soft polymer, which gave a leak of hydrogen gas from the gasket seal after the elapse of approximately 2000 hours in the cell performance test.

It was confirmed that the polymer compounds containing respectively contained the acryloyl groups, the methacryloyl groups, the isocyanate groups, and the epoxy groups as the end functional groups and were cured by the, suitable polymerization reactions were also usable. Further, it was confirmed that, like the polymer compound having the allyl groups as the functional groups, these polymer compounds effectively prevented gas leaks over a long time period, when the number of repeated isobutylene oligomer units m expressed by Formula (2) was adjusted to the range of 56 to 72 and the degree of polymerization was not less than 8000.

EXAMPLE 10

Acetylene black carbon powder with 25% by weight of platinum particles (average particle diameter of about 30 angstrom) carried thereon was used as a reaction catalyst of the electrodes. Into a solution of the catalyst powder dispersed in isopropyl alcohol, a dispersion which was prepared by dispersing perfluorocarbonsulfonic acid powder expressed by Formula (3) in ethyl alcohol was dispersed to yield a paste. A catalyst reaction layer was formed on one face of carbon non-woven fabric having a thickness of 250 µm by means of screen printing with the paste. The quantity control was carried out to make the quantity of platinum included in the resulting electrode equal to 0.5 mg/cm² and the quantity of perfluorocarbonsulfonic acid equal to 1.2 mg/cm².

Cathode and anode having the identical configuration discussed above were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode assembly (MEA). The proton-conductive polymer electrolyte membrane used here was a thin film having 25 µm of perfluorocarbonsulfonic acid expressed by Formula (3) given above.

Figure 10:
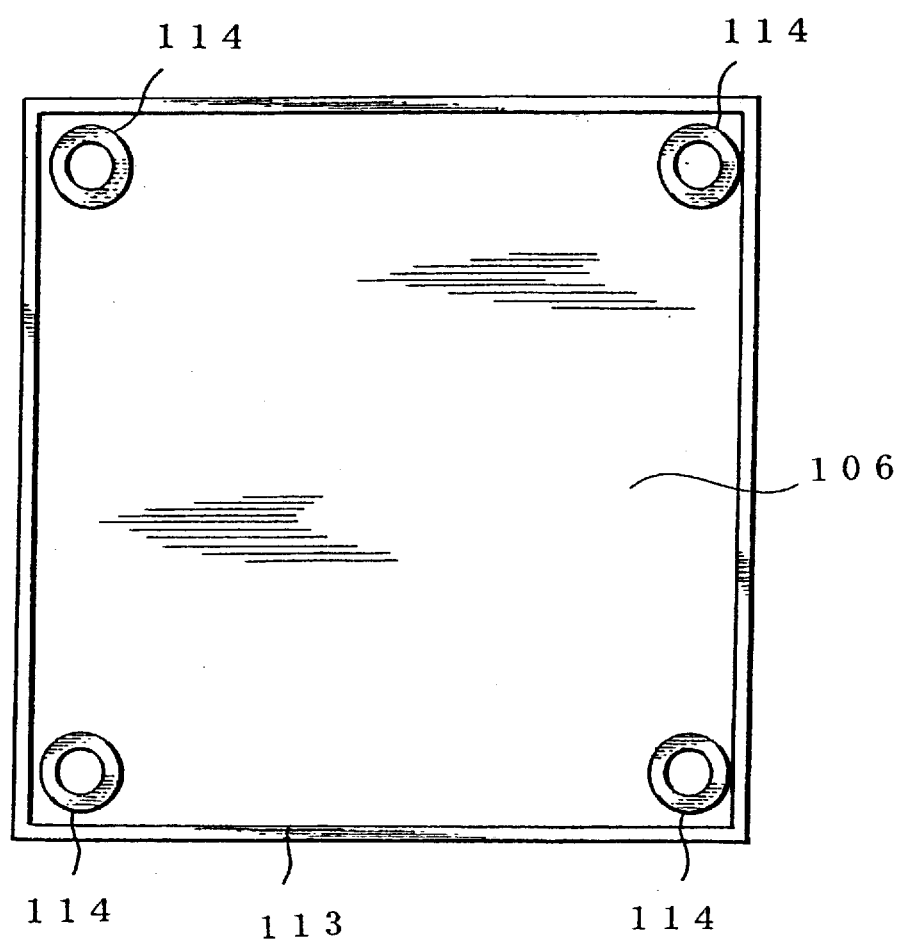
FIG. 10 is a top view schematically illustrating the structure of an MEA in Example 10 of the present invention.

Manifold apertures were punched out of the MEA as shown in FIG. 10 and a mixed solution of the reactive oligomer expressed by Formula (2) and cyclohexane was applied on inner circumferences 114 of the punched-out manifold apertures and outer-most circumferences 113 of the electrodes as shown in FIG. 10. Before the mixed solution was completely cured, the MEA was interposed between two separator plates, which had the shape shown in FIG. 5 and were composed of a non-porous carbon material, in such a manner that the gas flow paths formed in the respective separator plates faced each other to constitute a PEFC. On both faces of the PEFC, by attaching heater plates, collector plates, insulator plates, and end plates with required apertures for the manifolds and clamping the outermost end plates with bolts, springs, and nuts under the pressure of 20 kg/cm² per the area of the electrodes, a unit cell structure of the polymer electrolyte fuel cell was constituted.

While the PEFC manufactured in the above manner was kept at 75° C., hydrogen gas humidified and heated to have the dew point of 73° C. was fed to one of the electrodes and the air humidified and heated to have the dew point of 68° C. was fed to the other of the electrodes. This gave a cell voltage of 0.98 V under the non-loading condition. Although the test of gas leak from gasket portion (periphery) of the PEFC was measured, there was no leak detected. As the result that the PEFC was subjected to a continuous power generation test under the conditions of the fuel utilization of 80%, the oxygen utilization of 40%, and the current density of 0.3 A/cm$^2$, this PEFC kept the cell voltage of or lover 0.7 V over 7000 hours, enabling power generation without any deterioration of the cell voltage.

The polymer compound expressed by Formula (1) used in this example was obtained by polymerizing the compound expressed by Formula (2) wherein the repeated isobutylene oligomer units m was in the range of 56 to 72 with 64 on average and both the functional groups X and Y were allyl groups by adding 0.3% by weight of benzoyl peroxide as a polymerization initiator to the isobutylene oligomer through radical polymerization under the application of heat of 85° C. for 48 hours. After the curing, the degree of polymerization of the cured polymer was approximately 11000. Another known chemical, such as azobisisobutyronitrile, may be used as the polymerization initiator.

It was found that dispersion of an electron conductive agent in the polymer compound expressed by Formula (1) having polyisobutylene as the backbone structure improved the output properties of the resulting fuel cell. The seal portion was obtained by mixing the polymerizing compound expressed by Formula (2) wherein the number of repeated isobutylene oligomer units m was in the range of 56 to 72 with 64 on average and allyl groups were contained as both the functional groups X and Y, cyclohexane, acetylene black, and benzoyl peroxide were contained as a polymerization initiator at 100:20:5:1 (weight ratio) and by carrying but radical polymerization under the application of heat.

While the PEFC manufactured in the above manner was kept at 75° C., hydrogen gas humidified and heated to have the dew point of 73° C. was fed to one of the electrodes and the air humidified and heated to have the dew point of 68° C. was fed to the other of the electrodes. This gave a cell voltage of 0.98 V under the non-loading condition. Although the test of gas leak from gasket portion (periphery) of the PEFC was measured, there was no leak detected. As the result that the PEFC was subjected to a continuous power generation test under the conditions of the fuel utilization of 80%, the oxygen utilization of 40%, and the current density of 0.3 A/cm$^2$, this PEFC kept the cell voltage of or over 0.7 V over 5000 hours, enabling power generation without any deterioration of the cell voltage.

EXAMPLE 11

Acetylene black carbon powder with 25% by weight of platinum particles having an average particle diameter of about 30 angstrom carried thereon was used as a reaction Catalyst of the electrodes. Into a solution of the catalyst powder dispersed in isopropyl alcohol, a dispersion which was prepared by dispersing perfluorocarbonsulfonic acid powder expressed by Formula (3) in ethyl alcohol was mixed to yield a paste. A catalyst reaction layer was formed on one face of carbon non-woven fabric having a thickness of 1250 μm by means of screen printing method with the paste. The quantity control was carried out to make the quantity of platinum included in the resulting electrode equal to 0.5 mg/cm$^2$ and the quantity of perfluorocarbonsulfonic acid equal to 1.2 mg/cm$^2$.

Cathode and anode having the identical configuration discussed above were placed on the center of a proton-conductive polymer electrolyte membrane 107, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode 106 assembly (MEA). The proton-conductive polymer electrolyte membrane used here was a thin film having a thickness of 25 μm of perfluorocarbonsulfonic acid expressed by Formula (3) given above.

Figure 12:
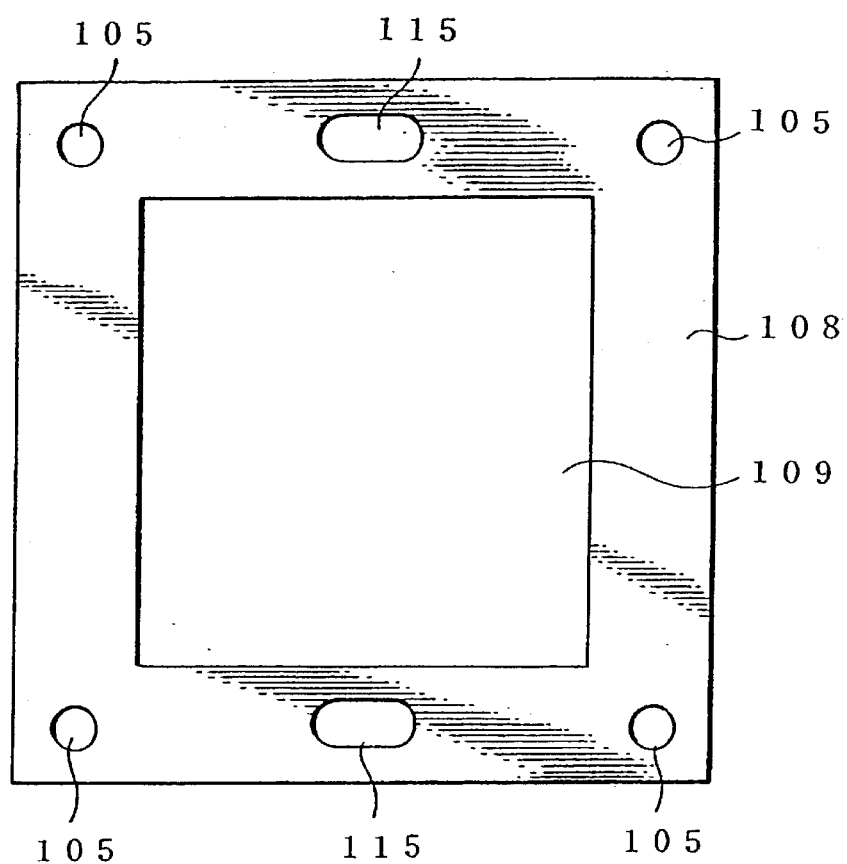
FIG. 12 is a top view schematically illustrating the structure of a plate-like molded gasket used in Example 11 of the present invention.
Figure 13:
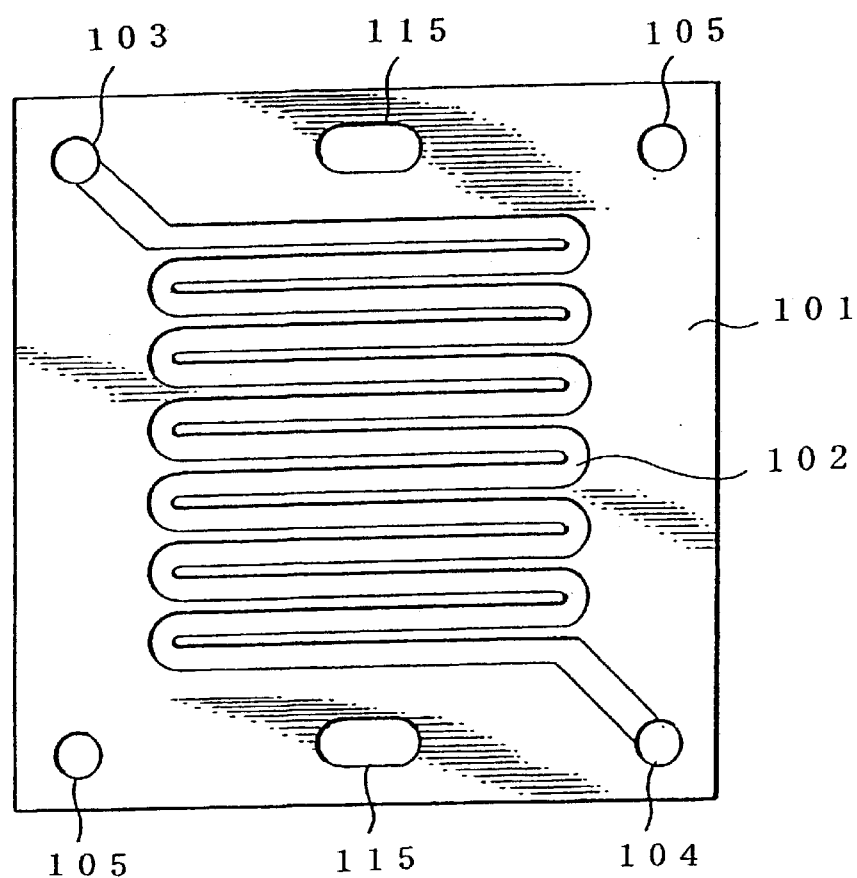
FIG. 13 is a top view schematically illustrating the structure of a separator plate used in Example 11 of the present invention.

The electrolyte membrane of the MEA over the area of the electrodes was interposed between two plate-like molded gasket seals, in such a manner that the electrodes of the MEA were fitted in rectangular apertures for the electrodes formed on the center of the plate-like molded gasket seals having the apertures for the electrodes, apertures for cooling water, and apertures for manifolds 115 shown in FIG. 12 and, further, the MEA and the plate-like molded gasket seals were then interposed between two separator plates that respectively had a gas flow path shown in FIG. 13, in such a manner that the gas flow paths formed in the respective separator plates faced each other to constitute a PEFC.

The separator plate was prepared by mixing expanded graphite powder with the polymer compound expressed by Formula (1) and press-molding the mixture. The separator plate had the gas flow path shown in FIG. 13 on one face thereof and a groove for the flow path of cooling water on the opposite face thereof.

The plate-like molded gasket used here was prepared by forming the required apertures in a three-layered structure (250 μm in thickness), where a center layer of a heat-resistant polyethylene terephthalate (PET) resin having a thickness of 100 μm was interposed between layers of 75 μm in thickness composed of the polymer compound expressed by Formula (1) given above.

Figure 14:
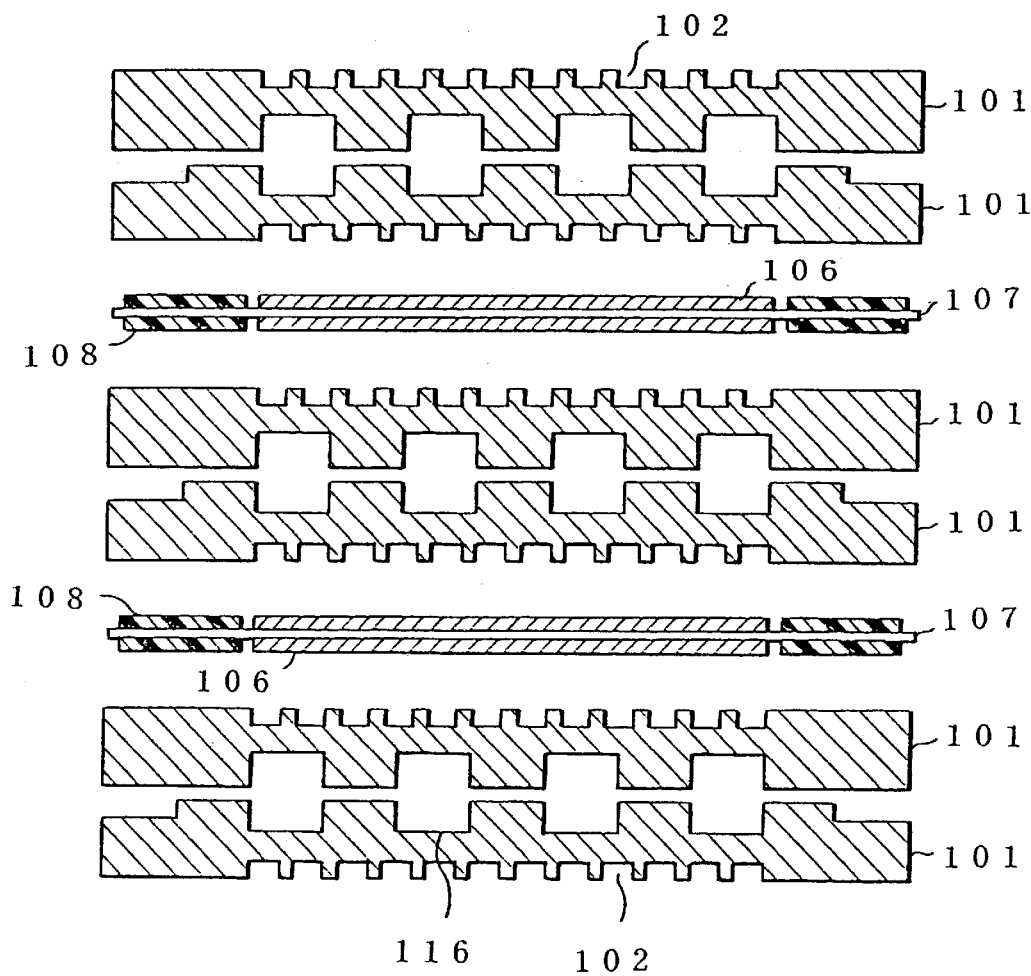
FIG. 14 is a sectional view schematically illustrating a PEFC in Example 11 of the present invention.

50 PEFCs of the above unit cell structure were successively laid one upon another to form a cell laminate as schematically illustrated in FIG. 14. The polymer compound expressed by Formula (1) was used for the sealing portions around a cooling water flow path 116. On the both faces of the cell laminate, by attaching collector plates, insulator plates, and end plates with required apertures for the gas and cooling water manifolds and clamping the outer-most end plates with bolts, springs, and nuts under the pressure of 20 kg/cm$^2$ per the area of the electrodes, a stack of PEFCs was constituted. While the PEFC stack was kept at 75° C. under the flow of cooling water, hydrogen gas humidified and heated to have the dew point of 73° C. was fed to the anode and the air humidified and heated to have the dew point of 68° C. was fed to the cathode. This gave a cell voltage of 49 V under the non-loading condition. There were no gas leaks from the gasket seals (periphery) of the PEFC stack. The PEFC stack was subjected to a continuous power generation test under the conditions of the fuel utilization of 80%, the oxygen utilization of 40%, and the current density of 0.7 A/cm$^2$. This PEFC stack kept the cell voltage of or over 31 V over 5000 hours, enabling power generation without any deterioration of the cell voltage.

EXAMPLE 12

Acetylene black carbon powder with 25% by weight of platinum particles having an average particle diameter of about 30 angstrom carried thereon was used as a reaction catalyst of the electrodes. Into a solution of the catalyst powder dispersed in isopropyl alcohol, a dispersion which was prepared by dispersing perfluorocarbonsulfonic acid powder expressed by Formula (3) in ethyl alcohol was mixed to yield a paste. A catalyst reaction layer was formed on one face of carbon non-woven fabric having a thickness of 250 $\mu$m by means of screen printing method with the paste as the raw material. The quantity control was carried out to make the quantity of platinum included in the resulting electrode equal to 0.5 mg/cm$^2$ and the quantity of perfluorocarbonsulfonic acid equal to 1.2 mg/cm$^2$.

Cathode and anode having the identical configuration discussed above were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode assembly (MEA). The proton-conductive polymer electrolyte membrane used here was a thin film having a thickness of 25 $\mu$m of perfluorocarbonsulfonic acid expressed by Formula (3) given above.

The electrolyte membrane of the MEA over the area of the electrodes was interposed between two plate-like molded gasket seals, in such a manner that the electrodes of the MEA were fitted in rectangular apertures for the electrodes formed on the center of the plate-like molded gasket seals having the apertures for the electrodes, apertures for cooling water, and apertures for manifolds shown in FIG. 12 and, further, the MEA and the plate-like molded gasket seals were then interposed between two separator plates that respectively had a gas flow path shown in FIG. 13, in such a manner that the gas flow paths formed in the respective separator plates faced each other. This gave a PEFC.

The separator plate was prepared by making a porous sheet of expanded graphite powder, which had been molded in advance, impregnated with the polymer compound, which was expressed by Formula (1) and had polyisobutylene as the backbone structure, and press-molding the polymer-impregnated porous sheet. The separator plate had the gas flow path shown in FIG. 13 on one face thereof and a groove for the flow path of cooling water on the opposite face thereof.

The plate-like molded gasket used here was prepared by forming the required apertures in a three-layered structure, where a center layer of a heat-resistant polyethylene terephthalate (PET) resin having a thickness of 100 $\mu$m was interposed between layers (sheets) of 75 $\mu$m in thickness composed of the polymer compound expressed by Formula (1) given above.

The polymer compound expressed by Formula (1) and used in this example had the same structure and was manufactured by the same method as Example 1.

50 PEFCs of the above unit cell structure were successively laid one upon another to form a cell laminate as schematically illustrated in FIG. 14. The polymer compound expressed by Formula (1) was used for the sealing portions around a cooling water flow path. On both faces of the cell laminate, by attaching collector plates, insulator plates, and end plates with required apertures for the gas and cooling water manifolds and clamping the outer-most end plates with bolts, springs, and nuts under the pressure of 20 kg/cm$^2$ per the area of the electrodes, a stack of PEFC was constituted.

While the PEFC stack was kept at 75° C. under the flow of cooling water, hydrogen gas humidified and heated to have the dew point of 73° C. was fed to the anode and the air humidified and heated to have the dew point of 68° C. was fed to the cathode. This gave a cell voltage of 49 V under the non-loading condition. There were no gas leaks from the gasket seals (periphery) of the PEFC stack. The PEFC stack was subjected to a continuous power generation test under the conditions of the fuel utilization of 80%, the oxygen utilization of 40%, and the current density of 0.7 A/cm$^2$. This PEFC stack kept the cell voltage of or over 31 V over 5000 hours. Namely this PEFC stack enabled power generation without any deterioration of the cell voltage.

EXAMPLE 13

Acetylene black carbon powder with 25% by weight of platinum particles having an average particle diameter of about 30 angstrom carried thereon was used as a reaction catalyst of the electrodes. Into a solution of the catalyst powder dispersed in isopropyl alcohol, a dispersion which was prepared by dispersing perfluorocarbonsulfonic acid powder expressed by Formula (3) in ethyl alcohol was mixed to yield a paste. A catalyst reaction layer was formed on one face of carbon non-woven fabric having a thickness of 250 $\mu$m by means of screen printing method with the paste as the raw material. The quantity control was carried out to make the quantity of platinum included in the resulting electrode equal to 0.5 mg/cm$^2$ and the quantity of perfluorocarbonsulfonic acid equal to 1.2 mg/cm$^2$.

Cathode and anode having the identical configuration discussed above were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode assembly (MEA). The proton-conductive polymer electrolyte membrane used here was a thin film having a thickness of 25 $\mu$m of perfluorocarbonsulfonic acid expressed by Formula (3) given above.

The electrolyte membrane of the MEA over the area of the electrodes was interposed between two plate-like molded gasket seals, in such a manner that the electrodes of the MEA were fitted in rectangular apertures for the electrodes formed on the center of the plate-like molded gasket seals having the apertures for the electrodes, apertures for cooling water, and apertures for manifolds shown in FIG. 12. The MEA and the plate-like molded gasket seals were then interposed between two separator plates that respectively had a gas flow path shown in FIG. 13, in such a manner that the gas flow paths formed in the respective separator plates faced each other. This gave a PEFC.

The separator plate was prepared by press-molding a porous sheet of expanded graphite powder, making the surface of the molded sheet with a gas flow path water-repellent, making the porous sheet impregnated with a mixed solution of the reactive oligomer expressed by Formula (2) and cyclohexane (mixing weight ratio of 10 to 2), and heating the impregnated porous sheet at 85° C. for 48 hours. The separator plate had the gas flow path shown in FIG. 13 on one face thereof and a groove for the flow path of cooling water on the opposite face thereof. The water repellency was attained by heating an applied layer of an aqueous dispersion of tetrafluoroethylene-hexafluoropropylene copolymer at approximately 350° C.

The plate-like molded gasket used here was prepared by forming the required apertures in a three-layered structure, where a center layer of a heat-resistant polyethylene terephthalate (PET) resin having a thickness of 100 μm was interposed between layers (sheets) of 75 μm in thickness composed of the polymer, compound expressed by Formula (1) given above.

50 PEFCs of the above unit cell structure were successively laid one upon another to form a cell laminate as schematically illustrated in FIG. 14. The polymer compound expressed by Formula (1) was used for the sealing portions around a cooling water flow path. The process interposed the cell laminate between respective pairs of collector plates, insulator plates, and end plates with required apertures for the gas and cooling water manifolds and clamped the outer-most end plates with bolts, springs, and nuts under the pressure of 20 kg/cm$^2$ per the area of the electrodes to yield a stack of PEFCs.

While the PEFC stack was kept at 75° C. under the flow of cooling water, hydrogen gas humidified and heated to have the dew point of 73° C. was fed to the anode and the air humidified and heated to have the dew point of 68° C. was fed to the cathode. This gave a cell voltage of 49 V under the non-loading condition. There were no gas leaks from the gasket seals (periphery) of the PEFC stack. The PEFC stack was subjected to a continuous power generation test under the conditions of the fuel utilization of 80%, the oxygen utilization of 40%, and the current density of 0.7 A/cm$^2$. This PEFC stack kept the cell voltage of or over 31 V over 5000 hours, enabling power generation without any deterioration of the cell voltage.

The polymer compound expressed by Formula (1) and used in this example was obtained by polymerizing the compound expressed by Formula (2) wherein the number of repeated isobutylene oligomer units m is in the range of 56 to 72 with 64 on average and allyl groups were contained as both the functional groups by adding 0.2% by weight of benzoyl peroxide as a polymerization initiator to the isobutylene oligomer through radical polymerization under the application of heat. The degree of polymerization of the cured polymer was approximately 9000.

EXAMPLE 14

Acetylene black carbon powder with 25% by weight of platinum particles having an average particle diameter of about 30 angstrom carried thereon was used as a reaction catalyst of the electrodes. Into a solution of the catalyst powder dispersed in isopropyl alcohol, a dispersion which was prepared by dispersing perfluorocarbonsulfonic acid powder expressed by Formula (3) in ethyl alcohol was mixed to yield a paste. A catalyst reaction layer was formed on one face of carbon non-woven fabric having a thickness of 250 μm by means of screen printing method with the paste as the raw material. The quantity control was carried out to make the quantity of platinum included in the resulting electrode equal to 0.5 mg/cm$^2$ and the quantity of perfluorocarbonsulfonic acid equal to 1.2 mg/cm$^2$.

Cathode and anode having the identical configuration discussed above were placed on the center of a proton-conductive polymer electrolyte membrane, which had a little greater area than that of the electrodes, and joined together across the electrolyte membrane by hot press, in such a manner that the printed catalyst layers of the electrodes were in contact with the electrolyte membrane as shown in FIG. 6 to give an electrolyte membrane-electrode assembly (MEA). The proton-conductive polymer electrolyte membrane used here was a thin film having a thickness of 25 μm of perfluorocarbonsulfonic acid expressed by Formula (3) given above.

Figure 15:
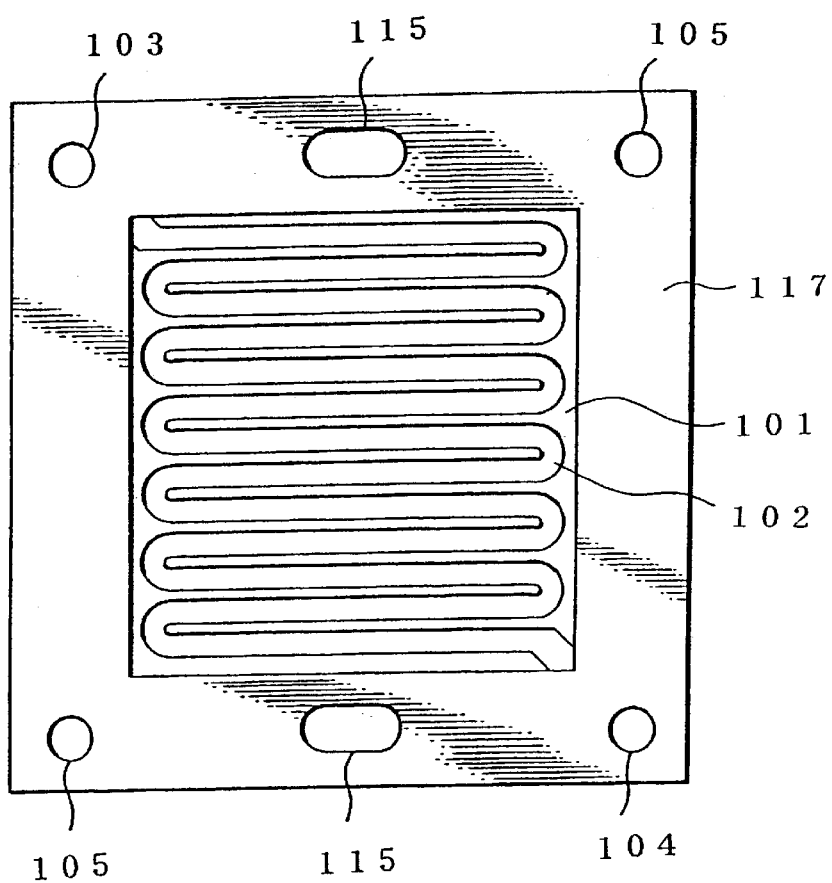
FIG. 15 is a top view schematically illustrating the structure of a separator plate used in Example 14 of the present invention.

The MEA was interposed between two separator plates having gas flow paths shown in FIG. 15, in such a manner that the electrodes of the MEA respectively face the gas flow paths formed in the separator plates to constitute a PEFC.

The central portion of the separator plate, which was in contact with the electrode, was composed of SUS316, whereas the peripheral portion of the separator plate, which was in contact with the electrolyte membrane, had gas and cooling water manifolds, and worked to seal the flows of gas and cooling water, was composed of the polymer compound expressed by Formula (1). The separator plate had the gas flow path shown in FIG. 15 on one face thereof and a groove for the flow path of cooling water on the opposite face thereof. This arrangement enabled the peripheral portion of the separator plate to function as the gasket seals, thereby not requiring separate gaskets.

Figure 16:
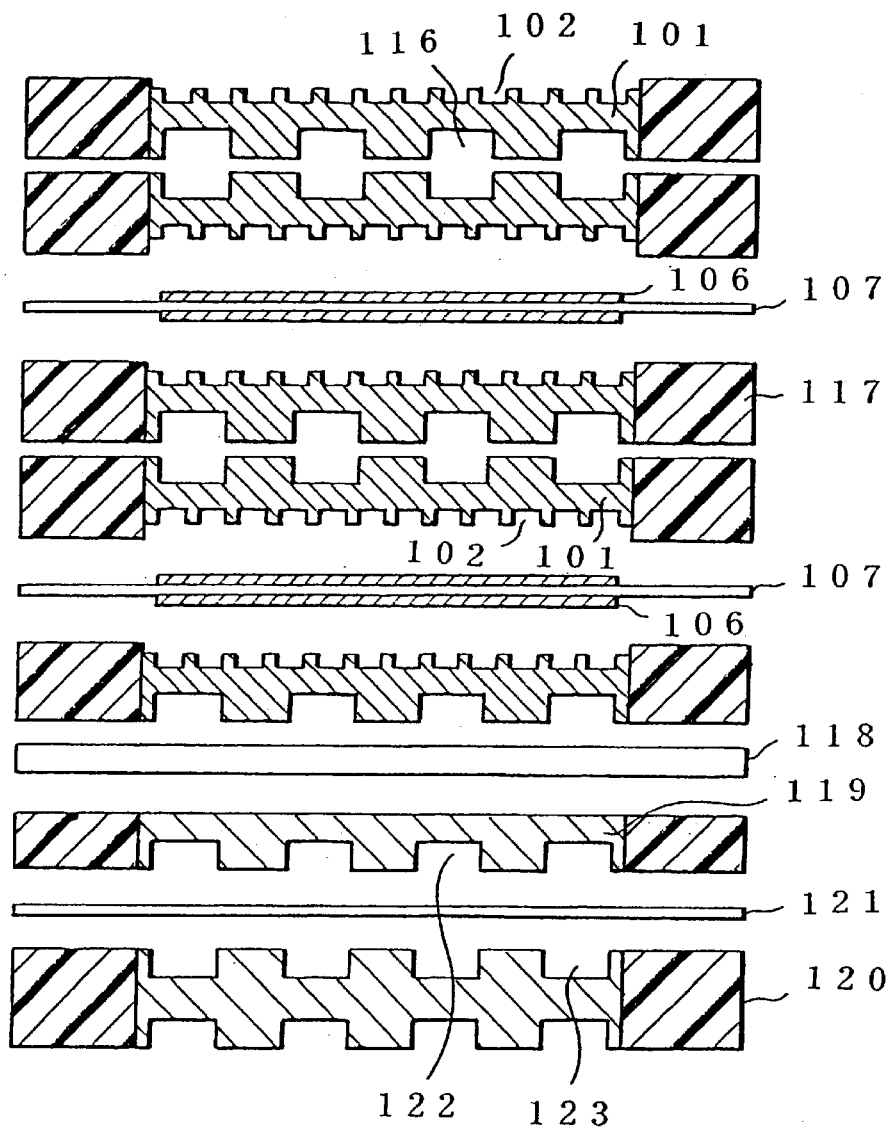
FIG. 16 is a sectional view schematically illustrating a PEFC including a layered internal humidifying unit in Example 14 of the present invention.

50 PEFCs of the above unit cell structure were successively laid one upon another to form a cell laminate as schematically illustrated in FIG. 16. Collector plates 118 having required apertures for the gas and cooling water manifolds were placed across the cell laminate and an internal humidifier was further placed via a partition plate 119 outside one of the collector plates 118. The internal humidifier had a polymer electrolyte membrane 121 on the center thereof, where the discharge of cooling water flew on one face of the polymer electrolyte membrane and the supply of gas flew on the other face thereof to enable the supply of gas to be heated and humidified simultaneously.

In the structure of FIG. 16, ten of such internal humidifiers were successively laid one upon another. In the drawing of FIG. 16, numerals 122 and 123 respectively represent a groove for a flow path of the discharge of cooling water and a groove for a gas inlet flow path. The polymer compound expressed by Formula (1) and placed around the internal humidifiers function as the gasket seals of the gas and cooling water and, like the separator plates, this arrangement does not require separate gaskets.

The process interposed the cell laminate between respective pairs of insulator plates and end plates with required apertures for the gas and cooling water manifolds and clamped the outer-most end plates with bolts, springs, and nuts under the pressure of 20 kg/cm$^2$ per the area of the electrodes to yield a stack of PEFCs.

While the PEFC stack was kept at 75° C. under the flow of cooling water, dry hydrogen gas was humidified and heated by the internal humidifier and fed to the anode and the dry air was humidified and heated by the internal humidifier and fed to the cathode. This gave a cell voltage of 49 V under the non-loading condition. There were no gas leaks from the gasket seals (periphery) of the PEFC stack. The PEFC stack was subjected to a continuous power generation test under the conditions of the fuel utilization of 80%, the oxygen utilization of 40%, and the current density of 0.7 A/cm$^2$. This PEFC stack kept the cell voltage of or over 31 V over 5000 hours. Namely this PEFC stack enabled power generation without any deterioration of the cell voltage.

The polymer compound expressed by Formula (1) and used in this example was obtained by polymerizing¥g the compound expressed by Formula (2) wherein the number of repeated isobutylene oligomer units m was in the range of 56 to 72 with 64 on average and allyl groups were contained as both the functional groups X and Y by adding 0.2% by weight of benzoyl peroxide as a polymerization initiator to the isobutylene oligomer and carrying out radical polymerization at 85° C. for 48 hours. The degree of polymerization of the cured polymer was approximately 9000.

Industrial Applicability

The present invention provides a polymer electrolyte fuel cell stack having excellent durability and productivity. Gasket sealing portions, a sealing portion for cooling water, and sealing portions for water and gas in an internal humidifying unit are constituted by a polymer compound that has polyisobutylene as the backbone structure. This arrangement gives the polymer electrolyte fuel cell stack having high reliability.

What is claimed is:

1. A polymer electrolyte fuel cell stack comprising a plurality of unit cells, each of said unit cells comprising a polymer electrolyte membrane, a pair of electrodes that are arranged across said polymer electrolyte membrane and respectively have a catalytic reaction layer, a separator having means for feeding a supply of fuel gas containing hydrogen gas to one of said electrodes, further comprising sealing portions arranged in such a manner that a periphery of each said polymer electrolyte membrane is interposed between a pair of said sealing portions, wherein said sealing portions have a three-layered structure, where a heat-resistant hard resin layer is interposed between a pair of elastic resin layers, wherein the heat-resistant hard resin layer comprises a polyethylene terephthalate resin and the elastic resin layers comprise a polymer of isobutylene oligomers expressed by Formula (2):

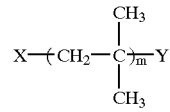

(2)

wherein X and Y are independently polymerizable functional groups.

* * * * *